United States Patent
Lala

(10) Patent No.: US 12,035,011 B2
(45) Date of Patent: Jul. 9, 2024

(54) METHODS AND SYSTEMS FOR GENERATING AND DISPLAYING A CUSTOMIZED USER WATCH LIST FOR VESSELS

(71) Applicant: VIASAT, INC., Carlsbad, CA (US)

(72) Inventor: Sanjay V. Lala, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 75 days.

(21) Appl. No.: 17/771,792

(22) PCT Filed: Dec. 23, 2019

(86) PCT No.: PCT/US2019/068388
§ 371 (c)(1),
(2) Date: Apr. 25, 2022

(87) PCT Pub. No.: WO2021/133381
PCT Pub. Date: Jul. 1, 2021

(65) Prior Publication Data
US 2022/0360860 A1   Nov. 10, 2022

(51) Int. Cl.
*H04N 21/482* (2011.01)
*H04N 21/414* (2011.01)
*H04N 21/431* (2011.01)

(52) U.S. Cl.
CPC ... *H04N 21/4825* (2013.01); *H04N 21/41422* (2013.01); *H04N 21/4312* (2013.01)

(58) Field of Classification Search
CPC ......... H04N 21/41422; H04N 21/4312; G08G 5/065; G08G 5/0082; G08G 5/0043; G08G 5/045; G08G 5/0013; G08G 5/0026
See application file for complete search history.

(56) References Cited

U.S. PATENT DOCUMENTS

| 10,499,273 | B1 | 12/2019 | Walsh |
| 2009/0164583 | A1* | 6/2009 | Zhu ................ H04L 67/1063 709/205 |
| 2017/0126521 | A1 | 5/2017 | Lala |
| 2017/0325111 | A1 | 11/2017 | Reese |

(Continued)

OTHER PUBLICATIONS

The International Searching Authority, "Search Report" in Application No. PCT/US2019/068388, dated Jul. 16, 2020, 17 pages.

*Primary Examiner* — Todd Buttram
(74) *Attorney, Agent, or Firm* — HOLZER PATEL DRENNAN

(57) ABSTRACT

Systems and methods for displaying onboard service information for vessels are described. In some embodiments, a method comprises receiving a user request to add a particular vessel to a user watch list associated with a user; adding a particular vessel identifier of the particular vessel to a set of vessel identifiers of a set of vessels included in the user watch list; and obtaining status of a service type of an onboard service provided on each vessel of the set of vessels. In response to receiving a request to display the user watch list, first graphical interface data is generated. The first graphical interface data represents: the set of vessel identifiers that corresponds to the set of vessels; a service icon for each corresponding vessel of the set of vessels; and a watch list header comprising labels for the set of vessel identifiers and the service type.

30 Claims, 9 Drawing Sheets

(56) References Cited

U.S. PATENT DOCUMENTS

2019/0101898 A1\* 4/2019 Middendorf ....... G05B 19/4188
2020/0005639 A1\* 1/2020 Walsh ..................... G08G 1/13
2020/0007410 A1\* 1/2020 Walsh ..................... H04L 41/22
2022/0108564 A1\* 4/2022 O'Sullivan .......... G07C 5/0816
2022/0360860 A1\* 11/2022 Lala .................. H04N 21/4312

\* cited by examiner

METHODS AND SYSTEMS FOR GENERATING AND DISPLAYING A CUSTOMIZED USER WATCH LIST FOR VESSELS

BENEFIT CLAIM

This application is a United States national phase entry of PCT International Application No. PCT/US19/68388 entitled "METHODS AND SYSTEMS FOR GENERATING AND DISPLAYING A CUSTOMIZED USER WATCH LIST FOR VESSELS" filed in US on Dec. 23, 2019, the contents of which are herein incorporated in their entirety by reference for all purposes.

BACKGROUND

Transportation vessels, such as aircrafts, cruise ships, trains, and others, provide a variety of onboard services to the passengers and customers. The onboard services may include various communications and entertainment services, such as access to the high-speed Internet and computer-based entertainment. Hence, the passengers who aboard a vessel may use their smartphones or seatback displays to browse the Internet, communicate via electronic mail and texting, or watch TV shows, movies, and broadcasts.

Quality of the onboard services is often measured in terms of the services' availability, reliability, usability, speed, and bandwidth. As the quality of the services increases, so does the passengers' satisfaction and enjoyment. However, providing the high-quality services often requires that the services are continuously monitored. This may include collecting data about the communications bandwidth and the services' availability and utilization, reliability. The collected information may be analyzed to detects problems and anomalies with the onboard services provided on the vessels.

The collected information may be voluminous, especially if it includes various metrics data collected for many types of onboard services and for many vessels. The voluminous data may be difficult to monitor efficiently and rapidly. Furthermore, in some situations monitoring all the collected information may not be necessary. For example, monitoring the information about the availability of the onboard services may be unnecessary for the vessels that are temporarily nonoperational. Furthermore, the monitoring may be unnecessary for the services that have been provided without any problems on the vessels for a long period of time.

Hence, to effectively monitor the onboard services, the services' status and metrics data needs to be collected and presented efficiently. Specifically, there should be a way to be able to dynamically select only those vessels that might potentially experience problems in providing the onboard services. Furthermore, the information reflecting the quality of the onboard services should be presented in a concise and communicative way.

SUMMARY

In some embodiments, a method for displaying a customized user watch list for vessels is presented. The customized user watch list may be customized by a user to allow the user to select the vessels providing onboard service to passengers that the user wants to monitor, i.e., watch. Examples of the vessels may include aircrafts, helicopters, ships, boats, trains, buses, and the like. Examples of different types of service (also referred to as "service type") of onboard service may include network communications and entertainment services, Internet access, email and texting, and broadcasting for providing news programs, movies, TV shows, and the like. An example of the user watch list may include a list that is customized to display the status of the onboard service on vessels that the user selected for watching.

A customized user watch list may be implemented to allow the efficient and rapid monitoring of onboard service provided on the selected vessels. The list may include, for example, identifiers of the selected vessels that a user wants to watch, and one or more features (e.g., color, shape, pattern) indicating the status of one or more service types of the onboard service provided for each watched vessel.

Content of a user watch list may be displayed as part of a computer-generated graphical user interface ("GUI"). The GUI may be generated by, for example, an on-ground server that executes a dashboard application and that obtains metrics data of the onboard service provided by vessels. The GUI may be configured to generate and display a graphical representation of the vessels that a user wants to watch, and the one or more features indicating status of onboard service provided on the watched vessels.

The user watch list may be displayed in a GUI in a communicative and concise way so that it can be easy to grasp. One way is to display the list in a succinct form and to depict the content of the list in a table-like form. The table may include identifiers of the watched vessels and indicate the status of onboard service for each watched vessel. For example, for each watched vessel, the table may include features indicating the status of network connectivity (e.g., the Internet service availability), the status of in-flight entertainment (IFE) service, and the like.

In some embodiments, a customized user watch list is used by service providers responsible for providing onboard service to the vessels. In the context of the vessels that are airplanes, a user watch list may be used by the airline operators to monitor the quality of the onboard service provided on selected airplanes operated by the airline.

In some embodiments, a method for visualizing a customized user watch list for vessels comprises receiving a user request to add a vessel to a user watch list associated with a user. The user request to add the vessel may be generated upon detecting that the user selected a certain icon, referred to as a watch tail icon, displayed within a GUI as the GUI also displayed an overview for the vessel.

A watch tail icon may be depicted in a GUI using a graphical design referred to herein as a descriptor. Depending on whether the watch tail icon is selected or not, the descriptor may change its appearance, including a change in a color and/or a shape and/or text. For example, if the watch tail icon is selected, then the watch tail icon may change its color from black to blue. But if the watch tail icon is deselected, then the icon may change its color from blue back to black.

In some embodiments, the method comprises adding the vessel identifier of the vessel to a set of vessel identifiers of a set of vessels included in the user watch list. This may be implemented in a variety of ways. For example, if a data structure for the user watch list has been already created for the user, then a new data record may be added to the structure and the vessel identifier may be included in the added record. However, if a data structure has not been yet created, then a new data structure may be created, a new data record may be added to the structure, and the vessel identifier may be included in the data record.

The method further comprises obtaining status of a service type of an onboard service provided on each vessel of the set of vessels. The status of the service type of the onboard service provided on a vessel may be determined based on an aggregation of the service type of the onboard service provided during one or more trips conducted by the vessel during a particular time period. For example, the status of a service type (e.g., network connectivity) on the vessel may be determined by aggregating metrics data (e.g., the measures of the Internet availability) during all trips conducted by the vessel during, for instance, a week-long time period. The status of the service type of the onboard service may be determined based on the aggregated metrics data and stored in an association with the vessel identifier of the corresponding vessel. A pointer or a hyperlink to the association may be stored in the data structure used to store the user watch list.

The method further comprises receiving a request to display the user watch list. The request may be received upon detecting that, for example, the watch tail icon displayed in the dashboard GUI has been selected. Alternatively, the request may be encoded in the user login profile; thus, each time the user logs in to a dashboard application, the request may be generated automatically, and, subsequently, the user watch list may be automatically displayed in the GUI.

In some embodiments, in response to receiving the request to display the user watch list, a computer system implementing the method generates graphical interface data that represents the contents of the user watch list. The graphical interface data may represent, for example, the set of vessel identifiers that corresponds to the set of vessels, a service icon for each corresponding vessel of the set of vessels, and a watch list header comprising labels for the set of vessel identifiers and the service type, or service types. The service icon for each corresponding vessel of the set of vessels may have one or more features that indicate the status of the service type of the onboard service provided by the corresponding vessel. The status may be retrieved using a hyperlink stored in the data structure used to store the user watch list, as described above.

The graphical interface data may be transmitted to a display device, which in turn, may generate the user watch list based on the graphical interface data. The user watch list may include the watch list header, the set of vessel identifiers, and the service icons arranged in rows under the watch list header. Different ways of depicting the user watch list are described below.

BRIEF DESCRIPTION OF THE DRAWINGS

A further understanding of the nature and benefits of the present approaches may be realized in reference to the following drawings. In the appended drawings, similar components or features may have the same reference label. Further, various components of the same type may be distinguished by following the reference label by a second label that distinguishes among the similar components.

In the drawings.

DETAILED DESCRIPTION

Figure 1:
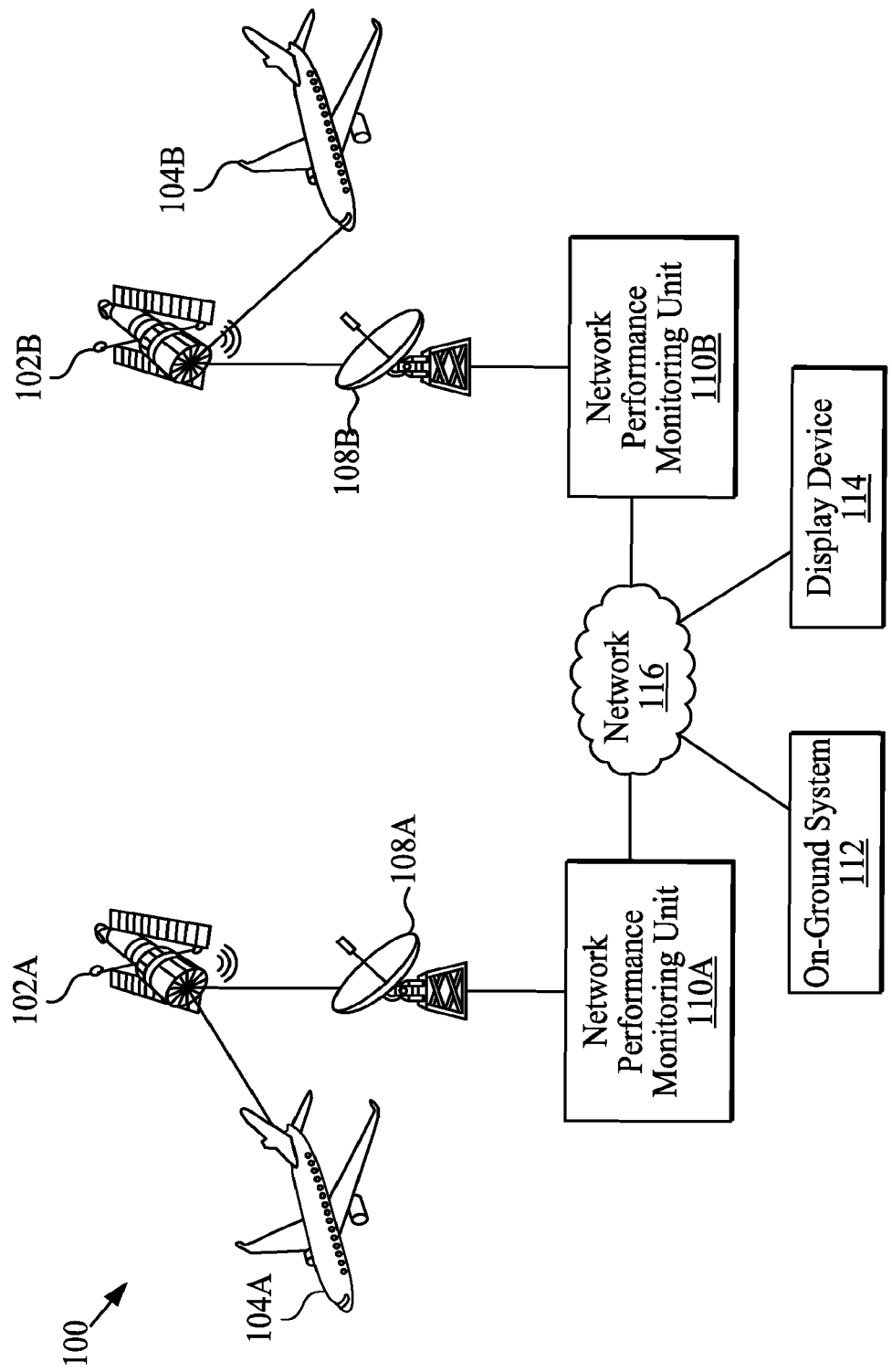
FIG. 1 is a simplified diagram of an example communications system for realizing mechanisms for visualizing a customized user watch list for vessels.

In the following description, for the purposes of explanation, numerous specific details are set forth in order to provide a thorough understanding of the methods described herein. It will be apparent, however, that the present approaches may be practiced without these specific details. In some instances, well-known structures and devices are shown in a block diagram form to avoid unnecessarily obscuring the present approaches.

Example Communications System for Visualizing a Customized User Watch List

Systems and methods are described for realizing mechanisms for generating and displaying a customized user watch list for vessels such as aircrafts, ships, trains, buses, and the like. The visualization of the customized user watch list is provided in a concise and communicative form, and thus allows a user to efficiently monitor performance of the onboard services provided on the selected vessels. The visualized data may indicate the status for certain types of service of onboard service provided to passengers on the selected vessels. The status of a service type may be based on collected metrics data associated with that service type. The metrics data can vary from embodiment to embodiment and can depend on the service type. For example, the metrics data may represent availability and utilization of the network communications connection. As another example, the metrics data may represent availability and utilization of inflight entertainment service provided in the vessels to the passengers. The metrics data may include, for instance, performance metrics indicating QoS metrics showing availability and utilization of the network connectivity and inflight services on individual vessels, individual trips, and/or individual portions of the trips. The QoS metrics may include a web browsing score, a video streaming score, a customer satisfaction score, and the like. The performance metrics may include upload speed metrics, download speed metrics, latency metrics, and the like.

The status of a service type of the onboard service provided on a vessel may be represented in a variety of ways. For example, the status may be represented by a single value (e.g., a number) and/or by a set of metrics values (e.g., a set of numbers). A single status value for a service type may be computed by aggregating different metrics data values determined for the service type provided during, for example, a plurality of trips conducted by the vessel during a particular time period. On the other hand, the status represented by a set of metric values may include the values each computed by aggregating the measures of the service type provided on an individual trip, or a plurality of trips, conducted by the vessel during a particular time period. For example, the status information of the network connectivity on a vessel may be a single value that represents an aggregation of the measures of the connection between the vessel and the network during all trips conducted by the vessel during a certain time period. As another example, the status of the network connectivity on a vessel may be represented by a set of metrics values where each value is computed by aggregating the measures of the connection during a particular trip, or a plurality of trips, conducted by the vessel during a certain time period.

The number and types of service types of onboard service provided to passengers can vary from embodiment to embodiments. Examples of communication service types may include network connectivity to the Internet and/or other networks. Examples of inflight entertainment service type may include streaming TV service, an inflight entertainment system providing access to content stored onboard such as movies, and the like. The availability and utilization of the onboard service may be collected by computer servers installed, for example, in the vessels. The servers may be referred to as onboard servers. The onboard servers may transmit the collected metrics data to one or more on-ground systems, which in turn, may process and aggregate the data, and display the aggregated data in a form of user watch lists on display devices. An example system configured to realize the mechanisms for visualizing the customized user watch list for vessels is depicted in FIG. 1.

FIG. 1 is a simplified diagram of an example communications system for realizing mechanisms for visualizing a customized user watch list for vessels. In some embodiments, communications system 100 comprises one or more communications satellites 102A-102B, one or more vessels 104A-104B, one or more network gateways 108A-108B, one or more network performance monitoring units 110A-110B, one or more on-ground systems 112, one or more display devices 114, and one or more data communications network 116. Other embodiments may include fewer or more components. In some embodiments, communication system 100 supports two-way communications between vessels 104A-104B, gateways 108A-108B, network performance units 110A-110B, network 116, on-ground systems 112, and potentially other components (not shown) of system 100 via an air-to-ground connectivity, or otherwise.

Display devices 114 may be configured to display contents of a customized user watch list for vessels. For example, display device 114 may be configured to generate a graphical user interface for presenting information about availability and utilization of the selected onboard services on the selected vessels.

Satellites 102A-102B may be configured to provide network communications connectivity to communications systems implemented in vessels 104A-104B, including target devices implemented and/or present in vessels 104A-104B. The target devices may be mobile devices that are operated by the crew and passengers of vessels 104A-104B, and may include smartphones, tablets, iPods, laptops, PDAs, and the like. Satellites 102A-102B may, for example, facilitate network communications to and from the target devices to provide the Internet access, TV shows, movies, data news feeds, and the like.

Vessels 104A-104B may be mobile machines that are configured to carry crew members, passengers, and cargo, and to provide communications network connectivity and onboard services on the vessels. Vessels 104A-104B may be configured to provide onboard service such as, for example, access to the Internet and/or inflight entertainment to the passengers.

Vessels 104A-104B may include onboard computer systems and sensor systems configured to collect and monitor metrics data about various events reflecting the onboard service being provided such as availability and utilization of network connectivity and/or inflight entertainment services in vessels 104A-104B. The events may include receiving requests for Internet connections, data communications sessions, downloading TV programs from content providers, downloading movies from the onboard movie content servers, and the like.

The metrics data collected by the onboard servers of vessels 104A-104B may include, for example, quality of service ("QoS") metrics showing availability and utilization of the network connectivity and inflight services on individual vessels, individual trips, and/or individual portions of the trips. The metrics data may include web browsing scores, video streaming scores, customer satisfaction scores, and the like. The metrics data may include upload speed metrics, download speed metrics, latency metrics, and the like.

The collected metrics data may be transmitted from the onboard servers of vessels 104A-104B to on-ground systems 112. The metrics data may be transmitted via, for example, network gateways 108A-108B.

Network performance monitoring units 110A-110B may also be configured to collect metrics data of onboard service provided to vessels 104A-104B. The metrics data may be collected by network performance monitoring units 110A-110B themselves, by satellites 102A-102B, and/or by vessels 104A-104B. The metrics data may be processed by any of monitoring units 110A-110B, on-ground systems 112, satellites 102A-102B, and/or vessels 104A-104B.

On-ground systems 112 may be configured to process the collected metrics data, aggregate it, and use to generate, for example, status of onboard service for user watch lists customized for users, such as vessel control centers operators, fleet operators, service providers, and vendors.

Network gateways 108A-108B may be computer-based systems configured to perform the functionalities of communications modems. The functionalities may include modulation and demodulation of signals communicated between satellites 102A-102B and network performance monitoring units 110A-110B. The functionalities may also include packet queuing, packet acceleration and deacceleration, network address translation ("NAT"), firewall-based security, periodic pinging, and other signal processing functionalities.

Communications network 116 may be implemented as any type of communications network or a group of networks. Network 116 may be configured to provide support for a variety of communications protocols, including broadband protocols, wireless protocols, and the like. Network 116 may support two-way communications between monitoring units 110A-110B, on-ground systems 112, display devices 114, and other computer systems and servers (not shown) implemented in system 100.

Example On-Ground System

Figure 2:
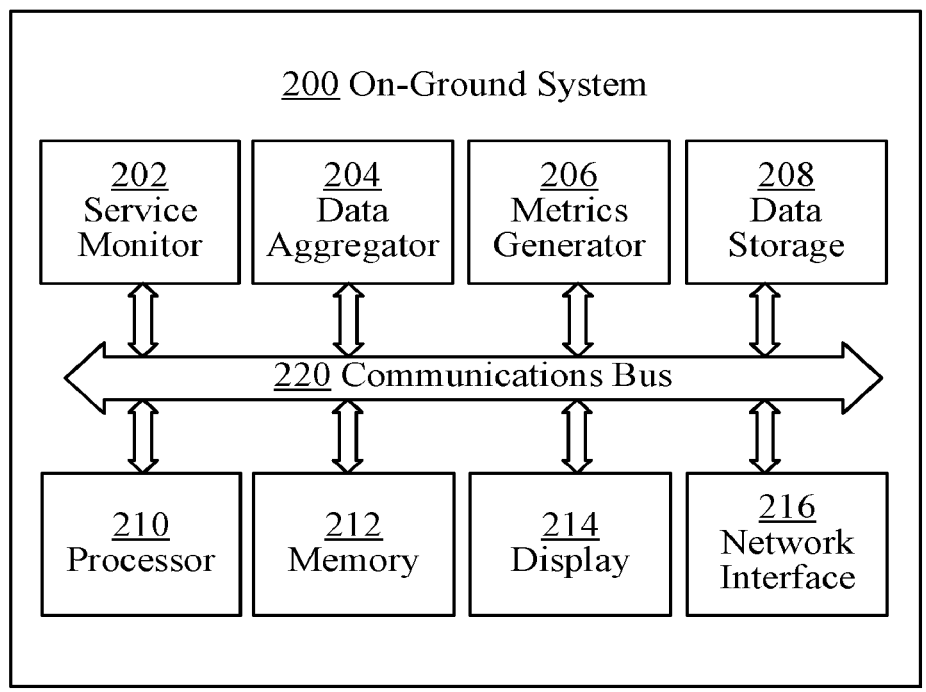
FIG. 2 is a block diagram depicting an example on-ground system for realizing mechanisms for visualizing a customized user watch list for vessels.

FIG. 2 is a block diagram depicting an example on-ground system for realizing mechanisms for visualizing a customized user watch list for vessels. On-ground system 200 in FIG. 2 may be the on-ground system 112 in FIG. 1. On-ground system 200 may be implemented in a computer server or a network of computer servers, such as cloud-based systems and/or virtual compute nodes.

In some embodiments, on-ground system 200 is configured to collect, monitor, aggregate, and otherwise process metrics data indicating performance of one or more service types of onboard service provided in vessels. On-ground system 200 may be configured to obtain, for example, vessel identifiers of the vessels for which onboard service is to be collected and monitored. On-ground system 200 may store a data structure the list of the vessels associated with the user watch list of each user and update and provide the list in response to user requests, as discussed in more detail below. On-ground system 200 may also receive identifying information of the user submitting the request, such that appropriate watch list can be provided in response.

On-ground system 200 may obtain the vessel identifiers using a variety of techniques. For example, the on-ground system 200 may request a list of vessel identifiers from a vessel control center of a vessel fleet operators and store the list in a storage device of on-ground system 200. On-ground system 200 may use the vessel identifiers as, for example, search keys in queries issued by the on-ground system to request metrics data about the onboard service provided on the corresponding vessels. For example, on-ground system 200 may use a vessel identifier as a search key in a query issued to an onboard server installed in vessel 104A (shown in FIG. 1) to request metrics data about onboard service provided by vessel 104A within a particular time period. In other embodiments, the metric data about the onboard service provided on vessels is automatically provided by the onboard systems implemented in the vessels themselves or obtained from on-ground network performance monitoring units, or in conjunction with the onboard systems implemented in the vessels and the on-ground network performance monitoring units.

In some embodiments, on-ground system 200 comprises one or more service monitors 202, one or more data aggregators 204, one or more performance metrics generators 206, and one or more data storage units 208. System 200 may also comprise one or more processors 210, one or more memory units 212, one or more display devices 214, and one or more network interface cards 216. The components of on-ground system 200 may communicate with each other directly or indirectly via a communications bus 220. Other embodiments may include fewer or more components.

Display devices 214 may be configured to display customized user watch lists for users. For example, display device 214 may be configured to generate a graphical user interface for displaying a customized user watch list for one or more selected vessels in a concise and communicative form. The customized user watch list may indicate the status of onboard service provided on the selected vessels. Examples of the graphical representations generated using display 214 are provided in FIG. 6-7. Display 214 may be implemented as an electronic display, such as a CRT display, LCD display, touchscreen, mobile device screen, and the like.

Service monitor 202 may be configured to collect metrics data about various service types of onboard service provided in vessels, shown in FIG. 1. The events may include receiving requests for Internet connections, data communications sessions, TV programs downloads from content providers, movies downloads from the onboard movie content servers, and the like. The events may also include receiving indications that an Internet connection was or was not available in a vessel at a given time, that a data communications session was or was not successfully opened or closed, that a movie was or was not successfully downloaded to a target device operated by the vessel, and the like. Metrics data about the events may be collected as the passengers aboard the vessel, as the vessel travels, as the vessel reaches its destination, and/or as the passengers depart the vessel.

Data aggregator 204 may be configured to process, sort and aggregate the collected and monitored metrics data. Processed data may be sorted and/or aggregated based on service types, vessel identifiers, fleet identifiers, airline identifiers, airport identifiers, and the like. The type of processing performed on the data may depend on a variety of factors. For example, if the data pertains to a trip that a vessel has already completed, then the data may be aggregated based on a type of the data, a type of service that the data represents, a source that provided the data, and the like. However, if the data pertains to an ongoing trip, then the processing may include selecting, from the collected data, the most recently received data reflecting the current-up-to-date availability and utilization of the onboard services.

Metrics generator 206 may be configured to use the sorted and aggregated information to determine performance metrics for determining status for the services provided to passengers while onboard the vessel. The performance metrics may indicate, for example, the performance of one or more service types of onboard service provided on individual vessels, individual trips, and/or individual portions of the trips.

Metrics generator 206 may also be configured to encode the sorted and aggregated data into corresponding status indicators to reflect the performance provided in vessels. In some embodiments, metrics generator 206 determines the status of one or more service types of onboard service provided on selected vessels. The status of the service type may be determined based on metrics data collected for the service type provided on the selected vessels and may include information about the service characteristics of the services provided to the passengers. The status of a particular service type may have, for example, correspond to a value (or a range of values) of the service metrics determined for the particular onboard service. The status may be associated with one or more features of service icons to be displayed in the user watch list. Some of the features may be represented numerically as, for example, a single number or a set of metrics values. A single number status for a particular onboard service may be computed as an aggregation of the service metrics data collected for the particular onboard service during a certain time period. A set of metrics values for a particular onboard service may include values determined for the particular onboard service during different trips, and the like. Other features may be represented graphically using, for example, graphical elements such as icons having certain colors, patterns, and the like. A graphical feature for a particular onboard service may correspond to a value or a range of values determined based on the corresponding service metrics for the particular onboard service and may be depicted using a certain icon having a certain color or pattern that graphically represents the corresponding value or the corresponding value-range. The icons may be displayed within a GUI showing a customized user watch list, described later.

In some embodiments, the status may be determined by metrics generator 206 itself. Alternatively, the status may be provided by satellites 102A-102B, vessels 104A-104B, network gateways 108A-108B, and/or performance monitoring units 110A-110B, shown in FIG. 1.

Service metrics of the may be stored in data storage 208. Alternatively, or in addition to, the information and the metrics may be communicated to computer servers, such as other on-ground systems 200, and/or computer servers installed in on-ground systems 200. The status and the metrics may be used to generate, for example, a graphical user interface of a customized user watch list.

Processors 210 may be configured to provide the execution environment for performing various system-based functions and for performing the methods described herein. Processors 210 may be configured to provide, for example, support for executing an operating system and system functionalities implemented in on-ground system 200.

Memory units 212 may include random access memory ("RAM") and read-only memory ("ROM") units. Memory 212 may be used to store an operating system instructions and computer-readable and computer-executable instructions for implementing the methods described herein.

Network interface card 216 may be configured to facilitate communications between on-ground system 200 and vessels, satellites, network monitoring stations, vessel control centers, vessel operator centers, vendor centers, and the like. The interface may be implemented in hardware, software and/or a combination thereof, and may be implemented to support various communications protocols, including wireless communications protocols, broadband communications protocols, and the like. Network interface 216 may be also used to provide connectivity with input devices (not shown) configured in on-ground system 200. The input devices may include keyboards, touchscreens, audio devices, and the like, and may be used to provide inputs, requests for service performance information of onboard services, and the like.

In some embodiments, components of on-ground system 200 are located within a single location or enclosure. In other embodiments, the components of system 200 may be distributed across multiple locations or enclosures.

Example On-Board System

In some embodiments, a method for generating and displaying a customized user watch list for vessels is implemented in on-ground systems, such as on-ground system 200 shown in FIG. 2 or on-ground system 112 shown in FIG. 1. However, in other embodiments, the method may be implemented in onboard systems installed on the vessels themselves, such as vessels 102A-102B.

In some embodiments, onboard servers installed in vessels are used to collect service metrics data for the service type(s) of onboard services provided on the vessels and to transmit the collected metrics data from the onboard servers to the on-ground servers, which in turn, use the received metrics data to determine the status of each service type to generate the customizer user watch lists.

Figure 3:
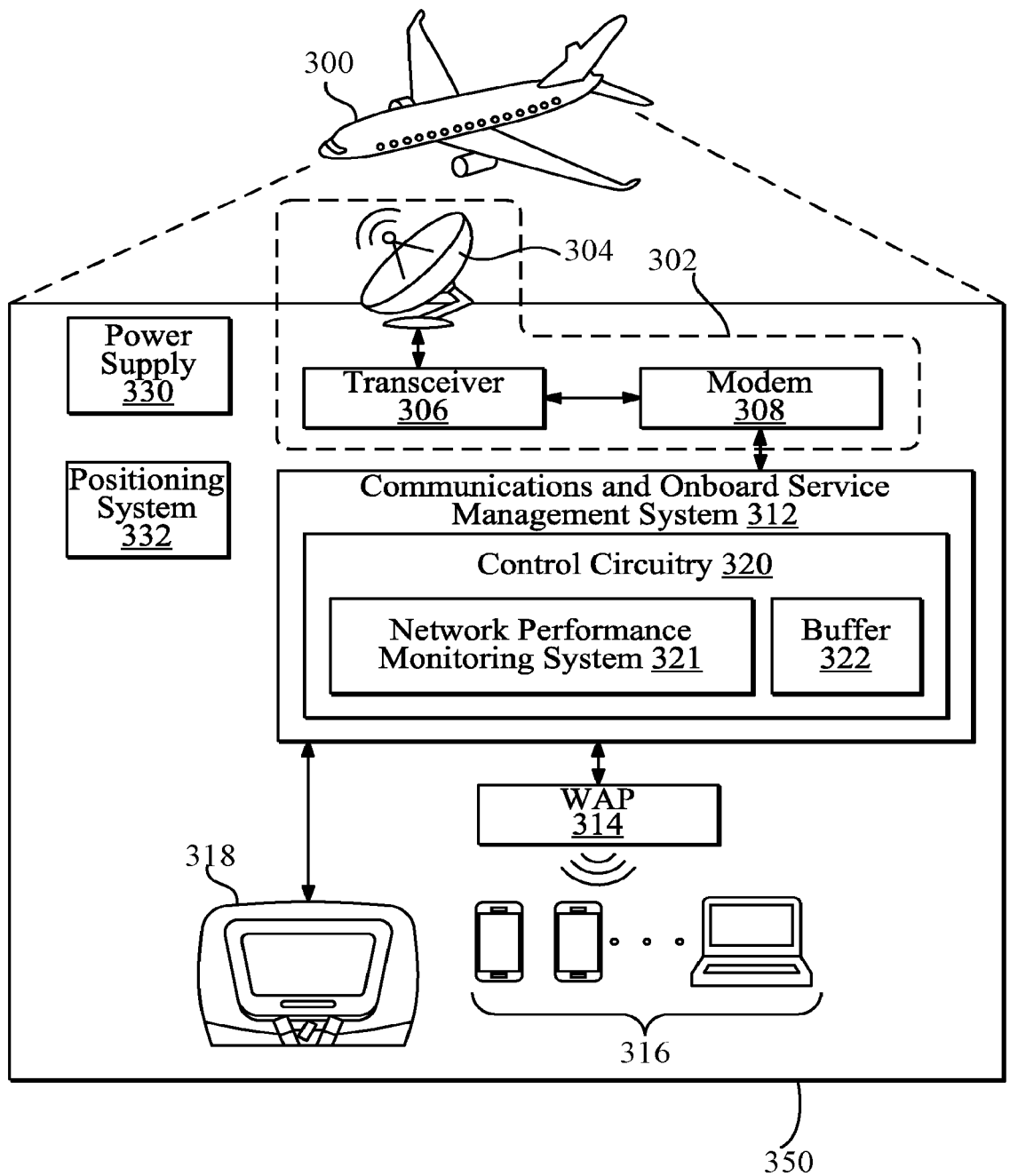
FIG. 3 is a block diagram depicting an example onboard system for supporting mechanisms for visualizing a customized user watch list for vessels.

FIG. 3 is a block diagram depicting an example onboard system for supporting mechanisms for visualizing a customized user watch list for vessels. The example depicted in FIG. 3 shows a vessel 300 which is an aircraft; however, in some other embodiments, vessel 300 may correspond to a helicopter, a cruise ship, a train, and the like. To provide simple examples, it is assumed that vessel 300 depicted in FIG. 3 corresponds to any vessel 104A-104B, shown in FIG. 1.

In some embodiments, vessel 300 comprises an onboard system 350. Onboard system 350 may be configured to collect metrics data of the service type(s) of onboard services provided on vessel 300. Onboard system 350 may be also configured to transmit the collected metrics data to on-ground system, such as on-ground system 200 shown in FIG. 2. The collected metrics data may be associated with unique identifier of vessel 300 (also referred to herein as a "vessel identifier") by the onboard system 350, and/or by the on-ground network performance monitoring units, and/or by the on-ground system.

If vessel 300 corresponds to an aircraft, then the identifier may include an aircraft identifier such as a tail number. The identifier may be configured, or hard-coded, in a computer system implemented in vessel 300. Additional information associated with the vessel may include a trip number such as a flight number, a travel segment number such as a route number, crew identifiers of crew members of vessel 300, equipment identifiers such as serial numbers of antennas or network devices, an origination terminal identifier, a destination terminal identifier, a scheduled departure time, a scheduled arrival time, and the like.

In some embodiments, vessel 300 includes various hardware components, software components, and/or combinations thereof. For example, vessel 300 may include one or more antennas 304, one or more transceivers 306, one or more modems 308, a communications and onboard service management system 312, one or more wireless access points ("WAPs") 314, as well as one or more onboard media clients implemented in one or more personal target devices 316, and/or one or more passenger seatback media systems 318. Vessel 300 is also equipped with a power supply unit 330 and a positioning system 332.

Antenna 304, transceiver 306, and modem 308 may be collectively referred to as a two-way communication system 302. System 302 may be configured to facilitate bidirectional communications with satellites, such as satellites 102A-102B, shown in FIG. 1.

Communications system 302 may be configured to support bidirectional data communications between communications networks such as the Internet, and target devices 316, seatback media systems 318, positioning system 332, and the like. For example, system 302 may be configured to provide uplink data received from target devices 316 and/or seatback systems 318 to modem 308 to allow generating modulated uplink data in the form of a transmit intermediate frequency ("IF") signal. System 302 may also support the reception of a forward downlink signal from a satellite (or other system such as an air-to-ground system) and the transmission of a return uplink signal back to the satellite (or other system such as an air-to-ground system) to support the bidirectional communications. System 302 may operate within the International Telecommunications Union ("ITU") Ku, K, or Ka-bands. Alternatively, communication system 302 may operate in other frequency bands such as C-band, X-band, S-band, L-band, and the like.

Antenna 304 may be configured to communicate signals between vessel 300 and satellites or other system (not shown in FIG. 3). The signals may be communicated via one or more communications links (not shown). Antenna 304 may be mounted to an elevation and azimuth gimbal which points antenna 304 toward the satellite and allows actively tracking the satellite.

Modem 308 may be implemented as a separate component, as shown in FIG. 3, or may be integrated with network performance monitoring system 321 of communications and onboard service management system 312. Modem 308 may be configured to generate modulated uplink data based on the uplink data received from communications and onboard service management system 312. The modulated IF signal may be delivered to transceiver 306.

Transceiver 306 may be configured to convert and then amplify the modulated uplink data to generate a return uplink signal and transmit the amplified signal via antenna system 304 to one or more satellites. Transceiver 306 may be also configured to receive, via antenna system 304, a forward downlink signal from the satellites. Transceiver 306 may, for example, amplify and down-convert the forward downlink signal and generate modulated downlink data, such as a receive IF signal, to be then demodulated by modem 308. The demodulated downlink data may be then provided from modem 308 to communications and onboard service management system 312 for routing to target devices 316 and/or seatback systems 318.

Target devices 316 may include smartphones, laptops, tablets, iPods, PDAs, netbooks, and the like, that have been brought onto vessel 300 by passengers and crew members. Target devices 316 and/or seatback systems 318 may communicate with communications and onboard service management system 312 via communication links (not shown) which may be wired and/or wireless. The communications links may be part of a local area network ("LAN") or a wireless area network ("WLAN") supported by WAPs 314. WAPs 314 may be installed in various locations of vessel 300 and may be configured to provide the traffic switching and routing functionalities.

Positioning system 332 may include Global Positioning System ("GPS") circuitry, configured to determine a present location or position of vessel 300. Positioning system 332 may receive positioning information from sensors installed throughout vessel 300. The position information may include readings of altitude, longitude, latitude, elapsed distance from an origination terminal, and the like. In some embodiments, each position reading is associated with a corresponding time value corresponding to the time at which vessel 300 was at a particular position, and at which a corresponding position value was recorded.

Communications and Onboard Service Management System

In some embodiments, vessel 300 is equipped with communications and onboard service management system 312. Management system 312 may be configured to store, for example, entertainment programs, and to serve the programs to target devices used by the passengers who boarded the vessel. In some embodiments, system 312 may include control circuitry 320 comprising a network performance monitoring system 321 and a data buffer 322. Control circuitry 320 may be configured to perform a variety of functions associated with providing onboard services and collecting and monitoring network performance of the onboard services provided on vessel 300 by communications system 302 and communications and onboard service management system 312.

In some embodiments, network performance monitoring system 321 is configured to perform a variety of functions associated with collecting metrics data of the onboard service provided in vessel 300. The functionalities may be similar to those of the network performance monitoring unit 110A described in FIG. 1. The collected metrics data may be stored in buffer 322 and transmitted to the on-ground system via the two-way communications system 302.

Communications and onboard service management system 312 may be configured to periodically repeat the process of collecting metrics data described above. Service management system 312 may be also configured to periodically report the metrics data to on-ground servers, such as on-ground system 112 described in FIG. 1 or on-ground system 200, described in FIG. 2.

In some embodiments, communications and onboard service management system 312 is configured to receive, from on-ground system 200 shown in FIG. 2 (which corresponds to on-ground system 112 in FIG. 1), a request for providing, by system 312, metrics data of the onboard services provided on vessel 300. In response to receiving the request, system 312 may collect and transmit the collected metrics data to on-ground system 200, shown in FIG. 2 (which corresponds to on-ground system 112 in FIG. 1). Service management system 312 may be also configured to monitor a location of vessel 300 and to periodically report the location of vessel 300 to the on-ground servers, including on-ground system 200, shown in FIG. 2.

Onboard services may include a variety of communications and entertainment services, such as the Internet access, email and texting support, and broadcasting support for providing news programs, movies, TV shows, and the like. Different onboard services may be divided into different groups of services, and each of the groups may include onboard services of the same service type. For each of the service type of the onboard service, the service metrics data may be collected and used to generate status information. The status of the service type of the onboard service for a particular vessel may be determined by aggregating the corresponding metrics data for the service type of the onboard service provided during one or more trips conducted by the particular vessel during a particular period of time. Examples of different service types may include an inflight entertainment ("IFE") service type, an inflight connectivity ("IFC") service type, a TV service type, an email service type, and a texting service type. A customized user watch list for selected vessels may be generated for selected service types of the onboard service. For example, suppose that a particular customized user watch list is generated for two vessels to provide status information for three selected services types, including the status for the IFE service type, the status for the IFC service type, and the status for the TV service type. For each of the three service types of the onboard services, the corresponding service metrics data is collected, aggregated to determine the status of each service type, and an indication of the status of each service type is displayed in a GUI generated for the particular customized user watch list.

Metrics Data

In some embodiments, communications and onboard service management system 312 is configured to generate metrics data for onboard services and inflight entertainment services provided in vessel 300 by communication system 302, and/or communications and onboard service management system 312. Metrics data may include, so called, raw information about a count of devices, such as target devices 316 and seatback systems 318, that are present, active and/or failed on board of vessel 300. The metrics data may also include processed data such as indicators of the QoS available on the devices. The QoS may be expressed in terms of bandwidth; network connectivity indicators; error rates; a data transmission rate expressed in, for example, Mbits per second; data flow volume expressed in, for example, an amount of Mbytes of transferred data; a modulation and coding scheme for communications to and from target devices 116 and seatback systems 318; bandwidth information associated with the communications measured in, for example, an available amount of network bandwidth; traffic type information for the traffic associated with the devices; user subscription information associated with the devices (including default subscriptions and premium subscriptions); and the like.

Metrics data may be measured using a variety of test protocols. For example, error rates, data rates, and latencies may be determined by using a protocol configured to test a connection between a target device and a local computer network, and to measure a response time as a sender transmits test packets via the network to a target device and receives a response to the test packet from the target device.

In some embodiments, the metrics data may be used to generate additional metrics data. This may include information about average numbers of dropped packets, average throughputs or delays observed during various time periods, availability of the onboard services during certain time periods, data transmission and retransmission rates, signal quality values, latency measures, packet loss rates, counts of target devices 316 connected during certain time periods, and the like.

Metrics data may include availability of the onboard service on vessels may be represented as a percentage of a certain time period during which the onboard service was available to target devices 116 and/or seatback systems 318. Metrics data reflecting the availability of the onboard service may also indicate the availability of one or more of uplink and/or downlink communications links.

Example Graphical User Interface

In some embodiments, a GUI is used to visualize a customized user watch list for watched vessels in a concise and easy-to-grasp form. The GUI may be configured to provide a dynamic, visual, time-based depiction of the status information of the onboard services provided by the watched vessels within a particular time range. The GUI may be used to visualize the user watch list to vessel center operators, vendors, service providers, and the like.

In some embodiments, an on-ground computer system, such as on-ground system 112 described in FIG. 1 or on-ground system 200 described in FIG. 2, is configured to generate a dashboard GUI, and to display the GUI on a display device, such as display device 114 shown in FIG. 1 or display 214 shown in FIG. 2. A user may provide a request to launch the GUI application by selecting, for example, an icon (not shown) that is displayed on a computer display. The icon configured to launch the GUI may be labeled with a label indicting, for example, a dashboard GUI application or a dashboard viewer.

Figure 4:
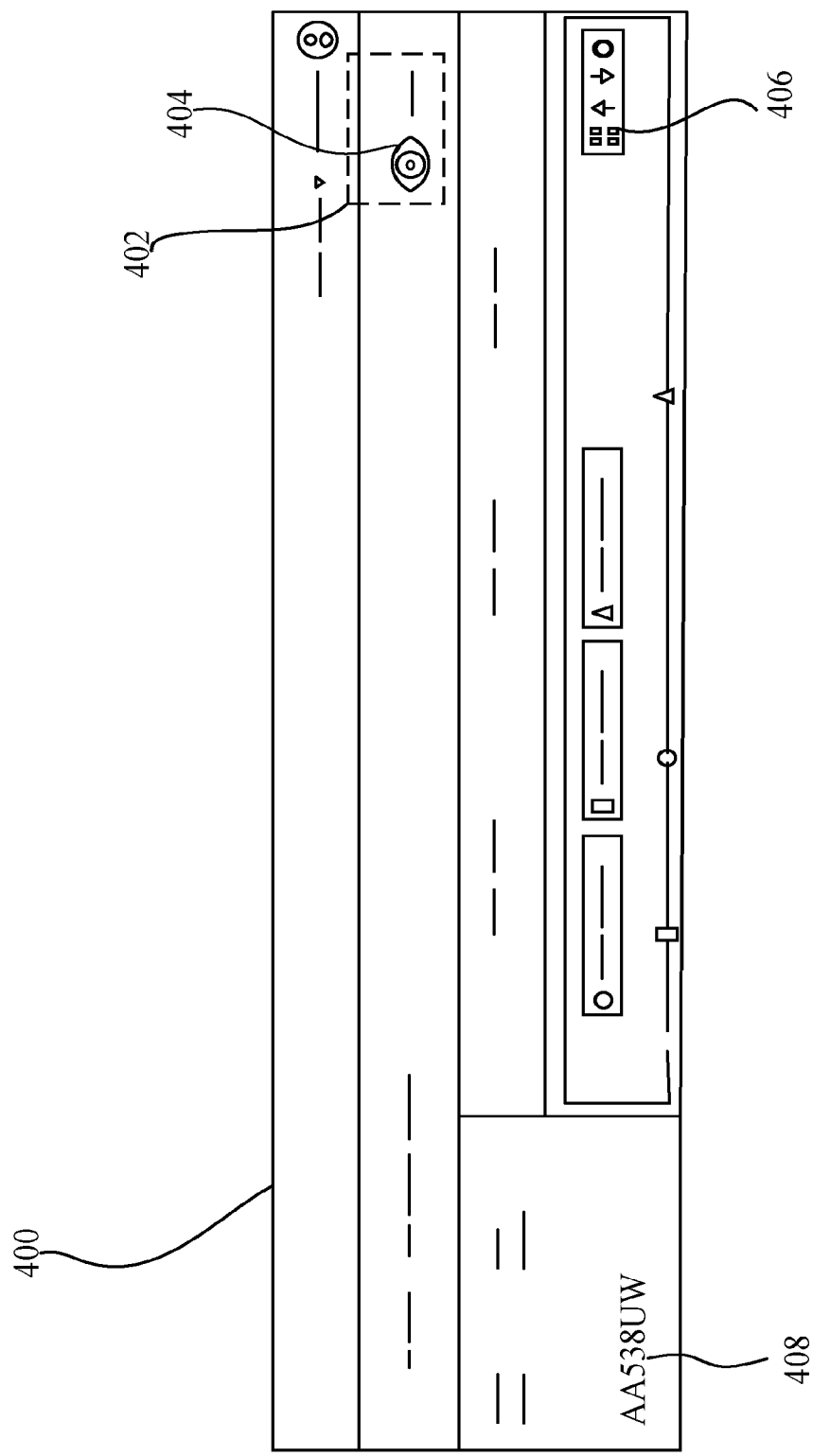
FIG. 4 is an example of a graphical user interface.

FIG. 4 is an example of a graphical user interface. Organization and appearance of GUI 400 may vary and may depend on the implementation. In some embodiments, GUI 400 depicts a variety of icons and descriptors that indicate, for example, vessels, trips, departure times, arrival times, status of various onboard services provided on the vessels, and the like. The information about the vessels may be organized in one or more tables, and the tables may be organized according to, for example, the vessels' identifiers.

In some embodiments, GUI 400 includes an information presentation window 408 for presenting information about a vessel. The location of presentation window 408 within GUI 400 may vary and may depend on the implementation. In the depicted example, presentation window 408 is located in the lower portion of GUI 400.

Contents displayed for a vessel in presentation window 408 of GUI 400 may vary and may include various types of information about the vessel or related to the vessel. The information may include the vessel's identifier and metrics data for the vessel. In the depicted example, presentation window 408 includes a vessel identifier "AA538UW" of the vessel. To provide clear examples, the remaining information about the vessel AA538UW depicted in presentation window 408 is omitted and only schematically suggested in FIG. 4 using line segments and icons.

GUI 400 may also include various interactive buttons and controls that allow to navigate through various pages of GUI 400, request additional information, request different views of the information in GUI 400, and enter values to be used to update GUI 400.

In some embodiments, GUI 400 includes navigation controls 406. Navigation controls 406 may be located in any part of GUI 400. In the depicted example, navigation controls 406 are shown in the lower right portion of GUI 400. Controls 406 may be used to navigate through GUI 400, scroll up and/or down the content displayed in GUI 400, request additional information to be displayed in GUI 400, and the like. To provide clear examples, the details of controls 406 displayed in GUI 400 are omitted, and the controls are only schematically suggested in FIG. 4.

Example Watch Tail Icon

In some embodiments, GUI 400 includes a watch tail region 402 for displaying, among other things, a watch tail icon 404. The location of watch tail region 402 and watch tail icon 404 may vary. In the depicted example, watch tail region 402 and watch tail icon 404 are shown in the upper right corner of GUI 400.

Watch tail region 402 and watch tail icon 404 may be displayed in GUI 400 in several situations. One situation is when GUI 400 also displays an overview for a vessel. In this situation, watch tail icon 404 may be used to allow the user to either to add the vessel to a customized user watch list or to remove the vessel from the customized user watch list. Watch tail region 402 and watch tail icon 404 may be also displayed when GUI 400 also displays a dashboard summary of, for example, a feet service configuration. In this situation, watch tail region 402 may include not only watch tail icon 404, but also the customized user watch list with the vessels that have been already included in the list.

In some embodiments, watch tail icon 404 is depicted using a simplified icon depicting an eye. For example, watch tail icon 404 may be a simplified depiction of a human eye. The depiction may include, for example, an eye sclera, an eye iris and an eye lash line. The level of detail of the eye icon may depend on the implementation and may range from a very simplified icon to a quite detail icon.

Watch tail icon 404 may be shown in a black-and-white scheme, or in a color scheme. The schemes may change depending on whether watch tail icon 404 is selected or deselected. The details are described later.

Watch tail icon 404 may have associated various functionalities. The functionalities may allow using watch tail icon 404 displayed in GUI 400 to, for example, add a vessel to a customized user watch list, remove the vessel from the list, view content of the list, and/or request additional information about the vessel included in the list.

Using Watch Tail Icon to Manage a Customized User Watch List

Watch tail icon 404 displayed in GUI 400 may be used to manage a customized user watch list. For example, if the vessel is not on the user watch list for this user, the watch tail icon 404 can include a descriptor indicating that (described in more detail below). The watch tail icon 404 may then be used to add a vessel to the customized user watch list if a user selects, or clicks on, watch tail icon 404 when an overview of the vessel is displayed in GUI 400. If the user selects, or clicks on, watch tail icon 404 when the overview of the vessel is also displayed in GUI 400, then an identifier of the vessel is added to the watch list by the on-ground system, and the status information for one or more service types of the onboard services provided on the vessel is displayed in the watch list. The request may be received from any type of input device, including a touch screen, a pointer, a mouse, a keyboard, and the like. Examples of input devices may include an input device 914 and a cursor control device 916, both described in FIG. 9.

If the vessel is not in a customized user watch list, upon detecting that the user selected watch tail icon 404, the vessel is added to the user watch list by the on-ground system. Referring again to FIG. 4, if GUI 400 displays watch tail icon 404 and an overview for the vessel AA538UW, and the vessel AA538UW has not been yet included in the user watch list, then, upon detecting that the user selected watch tail icon 404, the identifier AA538UW is added to the user watch list by the on-ground system. Subsequently, the list is updated and status information of the onboard services on the vessel AA538UW (and other vessels if such are included in the user watch list) may be displayed in GUI 400. The vessel AA538UW will be watched until the user submits a request to remove the AA538UW vessel identifier from the list. In some embodiments, upon the user may also sort or filter vessels based on whether the vessels are on the user's watch list.

Removing a vessel from a customized user watch list may be performed using watch tail icon 404. If the customized user watch list already includes the vessel, the watch tail icon 404 can include a descriptor indicating that (described in more detail below). In such a situation, upon detecting that the user selected watch tail icon 404, the vessel is removed from the user watch list. Referring again to FIG. 4, if GUI 400 displays watch tail icon 404 and an overview for the vessel AA538UW, and the AA538UW vessel identifier is already included in the list then upon detecting that the user selected watch tail icon 404, the identifier AA538UW is removed from the list by the on-ground system. Subsequently, the list is updated and the status of the onboard services on the vessel AA538UW is not displayed in GUI 400. The vessel AA538UW will not be watched until the user submits a request to add the AA538UW vessel identifier to the list using the process described above.

The process of adding a vessel to a customized user watch list may be repeated for each vessel that a user can view in GUI 400. Similarly, the process of removing a vessel from the customized user watch list may be repeated for each vessel that the user can view in GUI 400.

In some embodiments, a count of vessels included in a user watch list is limited to a predetermined number of vessels, such as 5, 10, or so. The limitation may also be imposed as a reasonability measure and may be based on physical limitations of a user and his ability to simultaneously watch the status of onboard services provided on many vessels. For example, it may by unrealistic to expect a user to simultaneously watch the status of the onboard services provided on, for example, 100 vessels. Since the human's ability to simultaneously watch many data points is usually limited, it is preferred that the user watch list be concise and succinct. Therefore, the count of vessels included in the list at one time may be limited to 5, or 10 in some embodiments.

Appearance of a Watch Tail Icon

In some embodiments, selecting/deselecting watch tail icon 404 has at least two effects: one effect is that the selecting/deselecting of watch tail icon 404 causes generating a request to add/remove a vessel to/from a customized user watch list. Another effect is that the selecting/deselecting of watch tail icon 404 causes a change in appearance of watch tail icon 404 shown in GUI 400.

Figure 5:
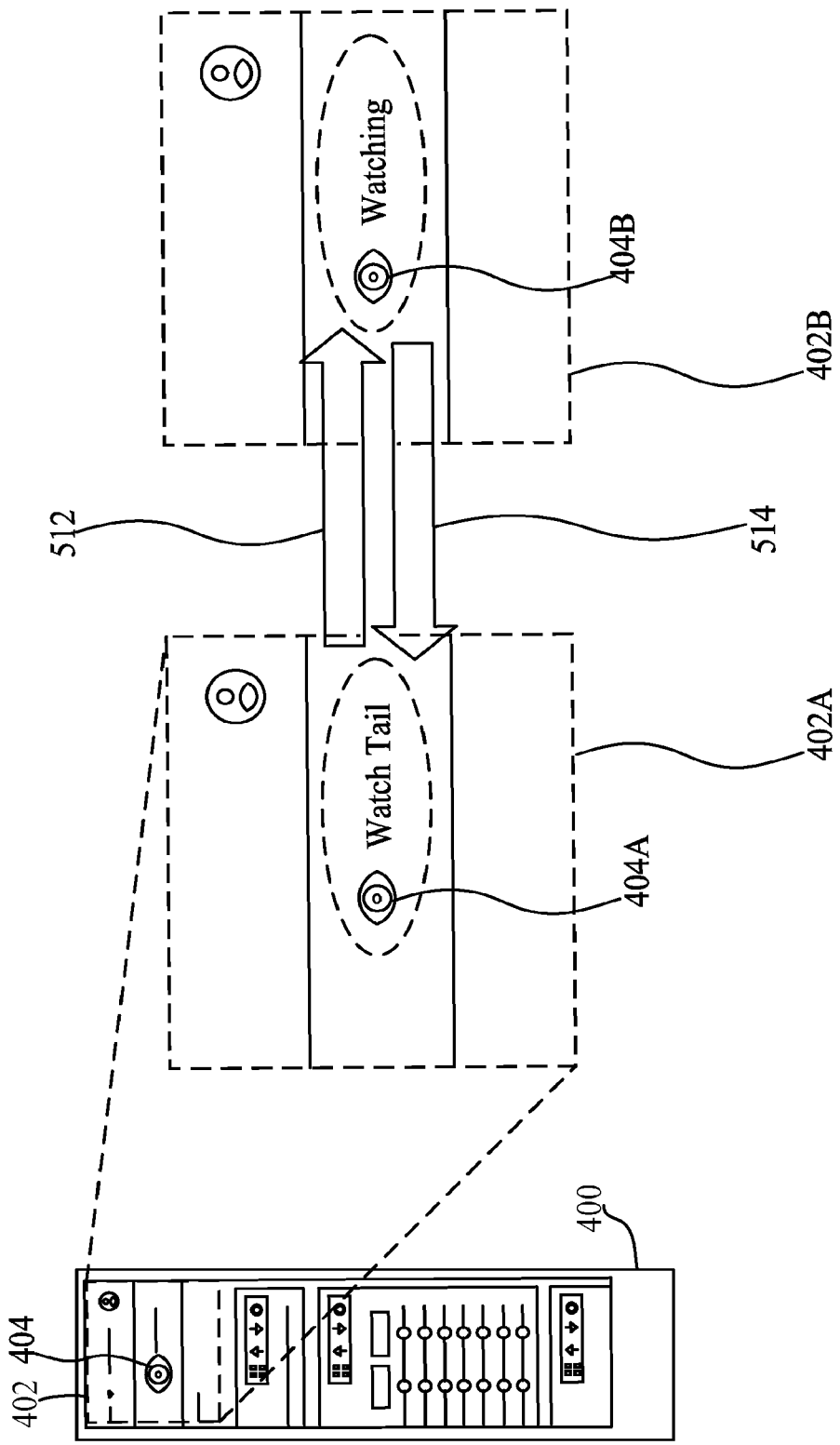
FIG. 5 depicts an example change in appearance of a watch tail icon.

FIG. 5 depicts an example change in appearance of a watch tail icon. The left portion of FIG. 5 shows part of GUI 400 and watch tail icon 404. The middle portion of FIG. 5 shows a magnified view of watch tail region 402A. Magnified watch tail region 402A includes a magnified watch tail icon 404A that is in an "unselected" state. The right portion of FIG. 5 shows a transition (an element 512) of unselected, magnified watch tail icon 404A to a selected magnified tail icon 404B in a magnified watch tail region 402B. To provide clear examples, other elements and components shown in FIG. 5 have been simplified, as they are irrelevant to the presented approach.

Suppose that it has been detected that a user selected watch tail icon 404A in GUI 400 as GUI 400 also displayed an overview for a vessel. In response thereto, not only is the vessel added to a customized user watch list, but also the appearance of the watch tail icon transitions (element 512) from unselected watch tail icon 404A to selected watch tail icon 404B. In the depicted example, the change in appearance is indicated by showing that unselected watch tail icon 404A can allow to "watch a tail," while selected watch tail icon 404B already allows "watching" the tail.

According to another example, suppose that it has been detected that a user deselected watch tail icon 404B in GUI 400 as GUI 400 also displayed an overview for a vessel. In response thereto, not only is the vessel removed from a customized user watch list, but also the appearance of the watch tail icon is transitions (an element 514) from selected watch tail icon 408B to unselected tail icon 404A. In the depicted example, the change in appearance is indicated by a descriptor "watching" in the selected watch tail icon 404B indicating the vessel is on the user's watch list, while the unselected watch tail icon 404A has the descriptor "watch a tail" indicating that the vessel is not on the user's watch list but can be added upon selection.

In some embodiments, changes in appearance of watch tail icon 404 caused by selecting/deselecting the icon are visualized using different descriptors. The descriptors may have different colors, and/or shapes, and/or text. In general, the appearance of unselected watch tail icon 404A in GUI 400 may be changed from a first descriptor to a second descriptor once the tail icon becomes selected watch tail icon 404B. If unselected watch tail icon 404A, shown using the first descriptor (e.g., a black color), is selected, then it becomes selected watch tail icon 404B which may be depicted using the second descriptor (e.g., blue color). That may indicate that the icon has been selected. However, if selected watch tail icon 404B is deselected, then it comes deselected watch tail icon 404A which may be depicted using the first descriptor (i.e., the black color). That may indicate that icon has been deselected. The changes in appearance of watch tail icon 404 using colors are not illustrated in black-and-white FIG. 5.

Example Customized User Watch List

Figure 6:
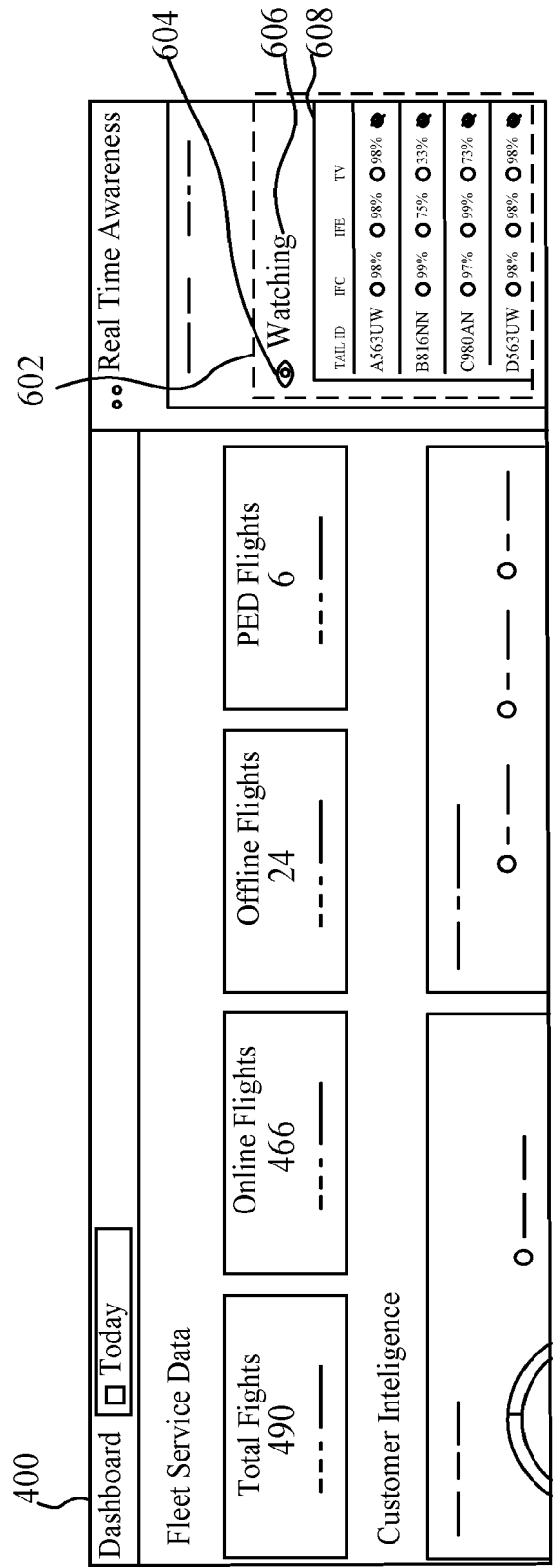
FIG. 6 depicts an example graphical user interface for visualizing a customized user watch list.

FIG. 6 depicts an example graphical user interface for visualizing a customized user watch list. GUI 400 shown in FIG. 6 also corresponds to GUI 400 shown in FIG. 4-5. Among other things, GUI 400 may include a watch list region 602 for displaying content of the customized user watch list on a dashboard view. Region 602 may be located in any portion of GUI 400, and its location depends on the implementation. In the depicted example, region 602 is located in the right portion of GUI 400.

The size and content of region 602 may vary and may depend on a count of vessels that are being watched and thus included in the customized user watch list. For example, if the customized user watch list is empty, and does not include any vessels selected for watching, then region 602 may only include a watch list icon 604, which may correspond to selected watch tail icon 404B in FIG. 5. However, if a customized user watch list includes one or more vessels that are being watched, then region 602 may include a table-based representation 608 showing vessel identifiers of the vessels on the user's watch list and status icons indicating the status of one or more service types of the onboard service provided on the watched vessels. Table-based representation 608 is also referred to as table 608.

Example Representations of a Customized User Watch List

A customized user watch list may be depicted in a GUI in many ways. One way is to depict the list as a table which includes rows and columns, and in which the status icons for vessels is displayed in the rows corresponding to the vessel identifiers. Example of such a table is table 608 depicted in FIG. 6.

Arrangements of table 608 may vary. The arrangements may depend on, for example, the type of identification of the vessels that are being watched, the service type(s) of the onboard service provided on the watched vessels, the number of different service types of the onboard service that are being watched for the vessels, and the like. For example, in the illustrated example table 608 is used to show a list of vessel identifiers of the watched vessels and status icons of three different service types (network connectivity or in-flight connectivity "IFC," in-flight entertainment "IFE," and television service "TV") of the onboard services provided on the watched vessels. Alternatively, the number and service type(s) indicated in the watch list may be different. Additional details of table 608 are provided in FIG. 7.

If table 608 is used to show several different watched vessels and more or less than three different service types of information of onboard services provided on the watched vessels, then the table representation may be larger or smaller than table 608, shown in FIG. 6. For example, it may include additional rows and/or additional columns. Furthermore, it may include pull-down menus, embedded hyperlinks allowing to access additional information, and the like.

Example Table Representation of a Customized User Watch List

In some embodiments, a service icon for each service type of onboard service for each corresponding vessel includes at least one feature indicating the status of the service type provided on the corresponding vessel. The number and type of feature(s) of the service icon can vary from embodiment to embodiment. In some embodiments, the feature(s) of the service icon includes a graphical representation of the status. In some embodiments, the feature(s) of the service icon includes a value corresponding to a measure of the status of the service type of the onboard service provided by the corresponding vessel.

The graphical representation of the status of the service type may include a circle that is shaded using a color that graphically indicates the status of the service type (for example, green for acceptable performance, yellow for partial performance, and red for poor performance). The value corresponding to the measure of the status of the service type may include a percentage value that numerically indicates the status of the service type.

Figure 7:
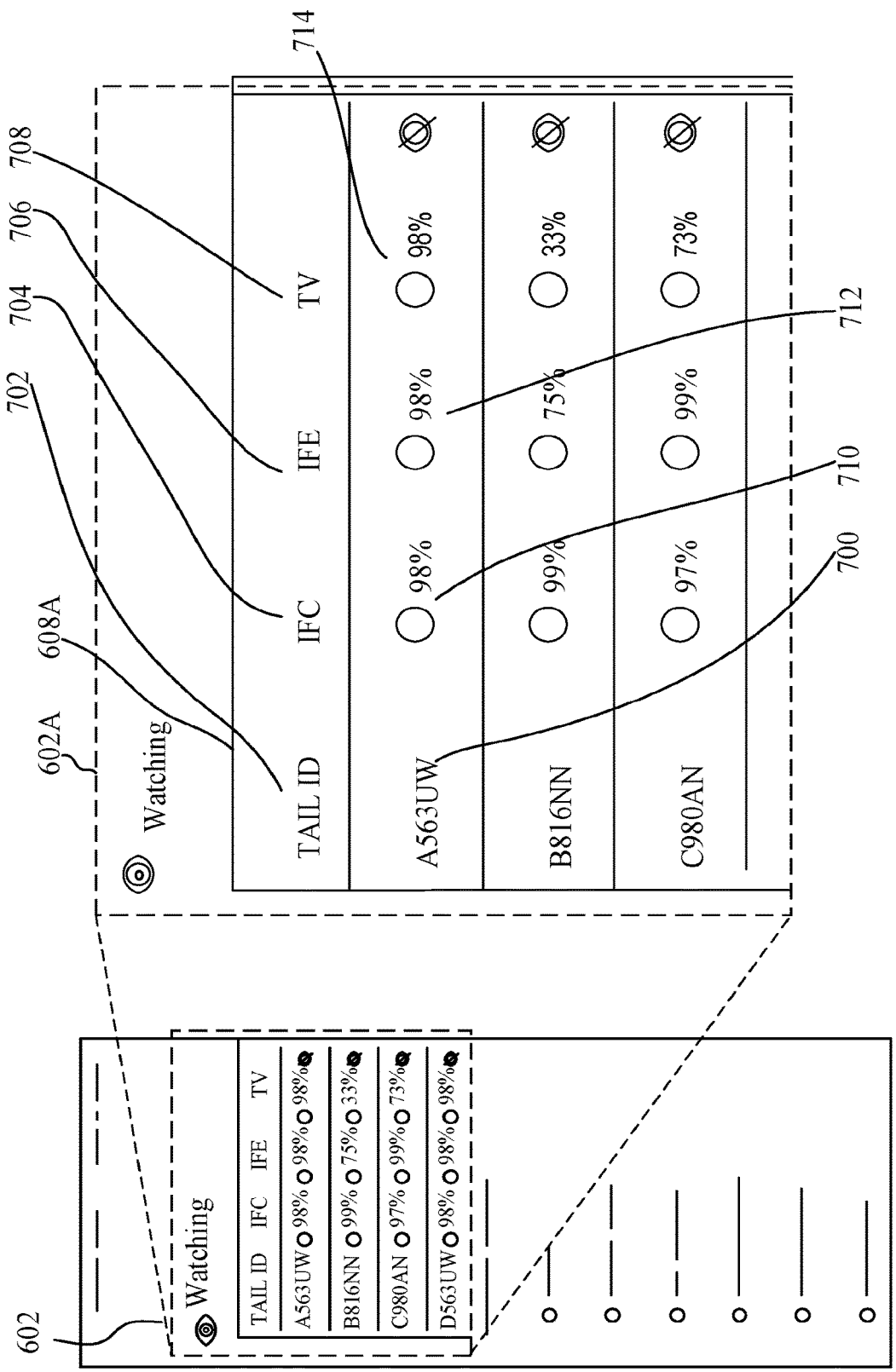
FIG. 7 depicts an example graphical user interface for visualizing an example customized user watch list.

FIG. 7 depicts an example graphical user interface for visualizing an example customized user watch list. The left portion of FIG. 7 shows region 602 (also shown in FIG. 6). The right portion of FIG. 7 shows an expanded view of region 602A that includes a table 608A depicting the customized user watch list.

In some embodiments, content of table 608A is generated based on graphical interface data representing a set of vessel identifiers that corresponds to a set of vessels that are on the user's watch list. The graphical interface data may also represent a service icon for each service type of the onboard service provided on each corresponding vessel of the set of vessels. In some embodiments, at least one feature of the service icon indicates the status of the service type of the onboard service provided by the corresponding vessel. The graphical interface data may also represent a watch list header comprising labels for the set of vessel identifiers and the service type(s).

Examples of different service types may include an IFE service type, an IFC service type, an IFE session service type, a Wi-Fi connectivity service type, a Wi-Fi session service type, a TV service type, a TV session service type, a data session service type, a promotional session service type, an email service type, and a texting service type. A subset of the different service types may be selected or determined in advance, and the service types included in the subset may be depicted in a header of table 608A.

In some embodiments, the service type(s) displayed in a watch list may be changed by adding or removing them. For example, a system administrator, may add new service types to the service types displayed in the watch list and/or may delete some service types from the list.

In some embodiments, table 608A includes a watch list header. The header may include a tail identifier label 702, and one or more service identifiers 704-706 of different service types of onboard service. In the illustrated example, the service identifiers 704-706 may include, for example, an IFC status identifier 704, an IFE status identifier 706, a TV status identifier 708, and the like. In some embodiments, the user may remove vessels from their watch list directly from the watch list. For example, as shown in FIG. 7, the table includes an icon depicting an eye with a line through it. Upon selection of this icon by the user, the corresponding vessel can be removed from their watch list.

Table 608A may also include the set of vessel identifiers and service icons arranged in rows under the watch list header. For example, for each vessel identifier of the watched vessels, table 608A may include a vessel identifier and service icon for each service type and arranged in the row identified by the vessel identifier and located under the watch list header.

The service icons may be used to graphically depict the status for each type of onboard services identified in the watch list header. Each service icon may graphically and/or textually indicate the status of the corresponding service type of the onboard service. In some embodiments, the status of the service icon of the service type of the onboard service provided on a vessel is represented numerically. For example, the status information for a particular service type may be represented by a single value (i.e., a number) that corresponds to an aggregation of different metrics data determined for the particular service type of the onboard service.

In some embodiments, the status of the service icon for a particular service type of the onboard service is represented by a set of metric values each computed by aggregating the measures of the service type of the onboard service provided on an individual trip, of a plurality of trips, conducted by the vessel during a particular time period.

The service icons may have different features, such as different colors, patterns, and the like. The different features may graphically represent the status of service types of the onboard services provided on selected vessels. A particular service icon used to graphically represent a particular service type on a particular vessel may include, for example, a color-coded circle, and the color of the circle may indicate the status of the particular service type of the onboard service provided on the particular vessel. In some embodiments, a green circle indicates a "good" status of the particular service type of the onboard service, while a yellow circle indicates an average status of the particular service type.

The different features, such as different colors and/or patterns, for different service types, such as the IFE service type or the IFC service type, correspond to specific service metrics data collected and/or computed for the corresponding service types. Thus, the values of "good" performance for the IFE may be quite different than the values of "good" performance for the IFC. However, regardless of the service type, the same set of features, such as colors and/or patterns, may be used to graphically represent all the service types in the watch list. For example, a green color may be used to represent the "good" status for the IFE, the IFC and TV, even though their respective values may be different for the IFE, the IFC and TV. Furthermore, a yellow color may be used to represent the "average" status for the IFE, the IFC and TV, even though their respective values may be different for the IFE, the IFC and TV. Using the same set of features for each service type can allow a user to quickly spot issues and determine whether the issue is limited to a particular service type or more broadly indicates an issue with a particular vessel.

In the example depicted in FIG. 7, table 608A includes information for several vessels, including a vessel A563UW (shown as element 700). Table 608A also includes several service icons, including service icons 710, 712 and 714. Each service icon 710-714 may include a circle filled with a color, or a pattern, that graphically corresponds to the status of the corresponding service type of the onboard service. Each service icon 710-714 may also include a numerical value that represents the status for the corresponding service type of the onboard service. For example, service icon 710 may indicate graphically and numerically the status of the IFC onboard service provided on the vessel A563UW. Service icon 712 may indicate graphically and numerically the status of the IFE onboard services provided on the vessel A563UW. Service icon 714 may indicate graphically and numerically the status of the TV onboard services provided on the vessel A563UW.

Appearance of service icons 710-714 may by dynamically updated. For example, if the quality of service of IFC onboard services provided on the vessel A563UW is high (i.e., in a top range), then icon 710 may include a circle shaded using a green color and a numerical value indicating the actual percentage value of the QoS of the IFC services provided on the vessel A563UW. However, if the quality of service of IFE onboard services provided on the vessel A563UW is low (i.e., in a low range), then icon 710 may include a circle shaded using a red color and a numerical value indicating the actual percentage value of the QoS of the IFE services provided on the vessel A563UW. The color representations are not depicted in black-and-white FIG. 7.

Determining Status Information for Onboard Services

In some embodiments, service icons depicted in table 608A indicate status of corresponding service types of the onboard services on the watched vessels. The status may be obtained using a variety of approaches.

According to one approach, status information for a particular service type of the onboard service on a particular vessel may be determined by an on-ground system, such as on-ground system 200 in FIG. 2, which corresponds to on-ground system 112 in FIG. 1. In some embodiments, the status information for a particular service type is determined as an aggregation of status of the particular service type of the onboard service provided during one or more trips conducted by the particular vessel during a particular period of time.

For example, if a particular period of time includes the last 30 days, and during the last 30 days, a particular vessel conducted 100 trips, and the status of the IFC onboard services on a half of the trips was high, but the status of the IFC onboard services on the remaining trips was low, then the average level of the IFC onboard services on all the trips conducted by the particular vessel within the last 30 days may be computed by determining an average value of all the levels on all the trips. In this example, the average value will represent a medium level. The resulting average value is referred to as a measure of the status of the service type.

Sharing a Customized User Watch List

A customized user watch list may be shared between users. For example, a user who created his own user watch list with a particular set of vessel identifiers, may generate a request to share his watch list with other users in his organization, his team, or his company. The request may be in the form of an email or a text message. The request may include, for example, a hyperlink to the location where the customized user watch list is stored. Alternatively, the request itself may include the customized list with the set of vessel identifiers.

Generating the request to share the customized user watch list with other users may be also implemented as a functionality of a GUI. In some embodiments, it is the same GUI that is used to create and display the customized user watch list for the user. The user may access the functionality by selecting, for example, a "share list" button (not shown) provided and displayed within the GUI.

In response to receiving the request to share the customized user watch list with a group of users, a server application or a GUI application may transmit the request, or the customized user watch list comprising the set of vessel identifiers, to the group of users. Upon receiving the list, the users may display the list and have the list updated by their computer systems.

Requesting Additional Information about a Vessel

In some embodiment, a customized user watch list may be used to request additional information about a vessel included in the list. For example, if the information displayed in the customized user watch list for a vessel is concerning and/or insufficient for some reasons, then a user may request additional information about the vessel by selecting the vessel identifier of the vessel shown in the customized list. To enable this, table 608A in FIG. 7 may be configured to provide hyperlinks associated with the vessel identifiers shown in table 608A. When selected, the hyperlinks may allow requesting additional information about the vessels. For example, each of the vessel identifiers displayed in table 608A may have an associated hyperlink which, when selected, causes generating a request for the additional information about the corresponding vessel. Once the additional information for the corresponding vessel is received, it may be subsequently displayed in a new or separate page of the GUI.

Example Flow Chart

Figure 8:
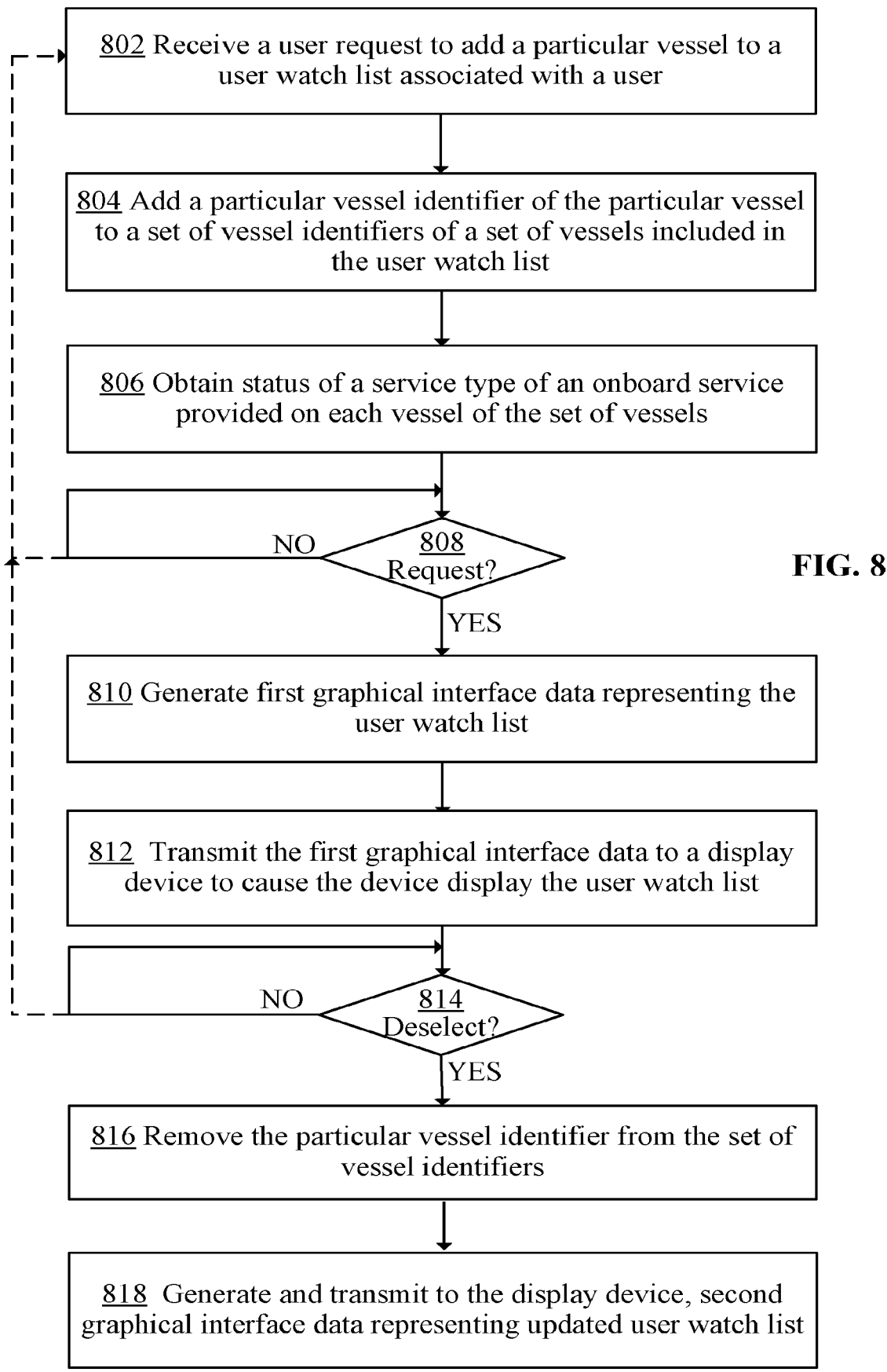
FIG. 8 is an example flow chart for an approach for realizing mechanisms for visualizing a customized user watch list for vessels.

FIG. 8 is an example flow chart for an approach for realizing mechanisms for visualizing a customized user watch list for vessels. The approach may be implemented in an on-ground server, and/or any other server or a computer system configured to communicate with vessels, service providers, and/or vendors. For the clarity of the description, the steps described in FIG. 8 are implemented in a process executed in an on-ground system 112/200, shown in FIG. 1/2. However, this should not be viewed as limiting the approach in any way.

In step 802, a process receives a user request to add a particular vessel to a user watch list associated with a user. The request to add the particular vessel may be generated upon detecting that the user selected, for example, a watch tail icon, displayed within a GUI as the GUI also displayed an overview for the particular vessel that is identified by the particular vessel identifier. For example, the request may be generated as the user selects watch tail icon 404 displayed in GUI 400, shown in FIG. 4.

In step 804, the process adds a particular vessel identifier of the particular vessel to a set of vessel identifiers of a set of vessels included in the user watch list. For example, if a data structure for the user watch list has been already created for the user, then a new data record may be added to the data structure and the particular vessel identifier may be included in the added record. But, if a data structure has not been yet created, then the structure may be created, a new data record may be added to the structure, and the particular vessel identifier may be included in the added record.

In step 806, the process obtains, for each vessel in the set of vessels, status of a service type of an onboard service provided on the vessel. The status of the service type of the onboard service provided by the vessel may be determined based on an aggregation of the service type of the onboard service provided during one or more trips conducted by the vessel during a particular time period. The service type information may include the aggregated status information about the service type availability and utilization during the trips conducted by the vessel within the particular time period. In some embodiments, the service type information includes the aggregated status information including network metric values determined for the onboard service type provided on the vessel. Examples of the metrics have been described in detail above. The status of the service type of the onboard service may be stored in a status-vessel association associating the status of the service type with the vessel identifier of the corresponding vessel.

In step 808, the process determines whether a request to display the user watch list is received. The request may be received upon detecting that the watch tail icon displayed in the dashboard GUI has been selected or may be automatically generated if it is encoded in the user login profile. Thus, each time the user logs in to a dashboard GUI, displaying the user watch list in the GUI is automatically requested.

If the server determines that a request has been received, then step 810 is performed. Otherwise, the step 808 is performed. Alternatively, as shown using a dashed-line, the process may receive a new request to add another vessel to the user watch list, and/or may obtain updated status information of service types of onboards services provided for each vessel included in the user watch list.

In step 810, the process generates first graphical interface data representing the contents of the user watch list. The first graphical interface data may be generated based on the set of vessel identifiers included in the user watch list and based on contents of the associations between the status of the service type of the onboard service and the vessel identifiers of the corresponding vessels.

The graphical interface data may represent, for example, the set of vessel identifiers that corresponds to the set of vessels, a service icon for each corresponding vessel of the set of vessels, and a watch list header comprising labels for the set of vessel identifiers and the service type. The service icon for each corresponding vessel of the set of vessels may indicate the status of the service type of the onboard service provided by the corresponding vessel. The status may be retrieved from the status-vessel association described above.

In step 812, the process transmits, to a display device, the first graphical interface data to cause the display device to generate and to display the user watch list. The user watch list may be displayed in a variety of ways. Some of the examples are shown in FIG. 7.

In step 814, the process determines whether a request to deselect the watch tail icon displayed within the GUI has been received. The request to deselect the watch tail icon is received if the user selects the watch tail icon which has been previously selected. The deselection may be visualized in the GUI by changing the color/shape of the watch tail icon depicted in the GUI.

If the request to deselect the watch tail icon has been received, then the process proceeds to performing step 816. Otherwise, step 814 is repeated. Alternatively, as shown using a dashed-line, the process may proceed to step 802 and receive a new request to add another vessel to the user watch list.

Step 816 is performed if the process detects that the user deselected the watch tail icon. It is assumed that the user requested removing the particular vessel identifier from the list that already included the particular vessel identifier.

In this step, the process removes the particular vessel identifier from the set of vessel identifiers, and thus causes removing the particular vessel from the user watch list to form an updated user watch list.

In step 818, the process generates second graphical interface data representing the updated user watch list. It is possible that the updated user watch list includes no vessel identifiers. In the case, the second graphical interface data will include no vessel identifier information and no status service type information. However, if the updated user watch list includes one or more vessel identifiers, then the second graphical of the user watch list may include the watch list header and the updated set of vessel identifiers and the service icons arranged in rows under the watch list header.

Also, in step 818, the process transmits, to the display device, the second graphical interface data to cause the display device to generate and to display the updated user watch list.

The process described in FIG. 8 may be repeated as new requests to add vessel identifiers are received, the new status of service types of the onboard services provided on the watched vessels is provided, and the updated user watch list is received.

Example Implementation Mechanisms

An implementation of the disclosed approach for visualizing a customized user watch list for vessels may encompass performance of a method by a computing system having one or more processors and storage media. The one or more processors and the storage media may be provided by one or more computer systems, and not necessarily by the same computer system. The storage media of the computing system may store one or more computer programs. The one or more programs may include instructions configured to perform the method. The instructions may also be executed by the one or more processors to perform the method.

An implementation of the disclosed approach may encompass one or more non-transitory computer-readable media. The one or more non-transitory computer-readable media may store the one or more computer programs that include the instructions configured to perform the methods disclosed herein.

An implementation of the disclosed approach may encompass the computing system having the one or more processors and the storage media storing the one or more computer programs that include the instructions configured to perform the method.

An implementation of the disclosed approach may encompass one or more virtual machines that operate on top of one or more computer systems and emulate virtual hardware. A virtual machine can be implemented by, for example, a Type-1 or Type-2 hypervisor. Operating system virtualization using containers is also possible, and may be implemented in conjunction with, for example, hardware virtualization utilizing the hypervisors.

For an implementation that encompasses multiple computer systems, the computer systems may be arranged in a distributed, parallel, clustered or other suitable multi-node computing configuration. The computer systems may be continuously, periodically, or intermittently interconnected by one or more data communications networks (e.g., one or more Internet protocol ("IP") networks.) The set of computer systems that execute the instructions may be the same set of computer systems that provide the storage media storing the one or more computer programs, and the computer systems may only partially overlap or may be mutually exclusive. For example, one set of computer systems may store the one or more computer programs from which another, different set of computer systems downloads the one or more computer programs and executes the instructions thereof.

Figure 9:
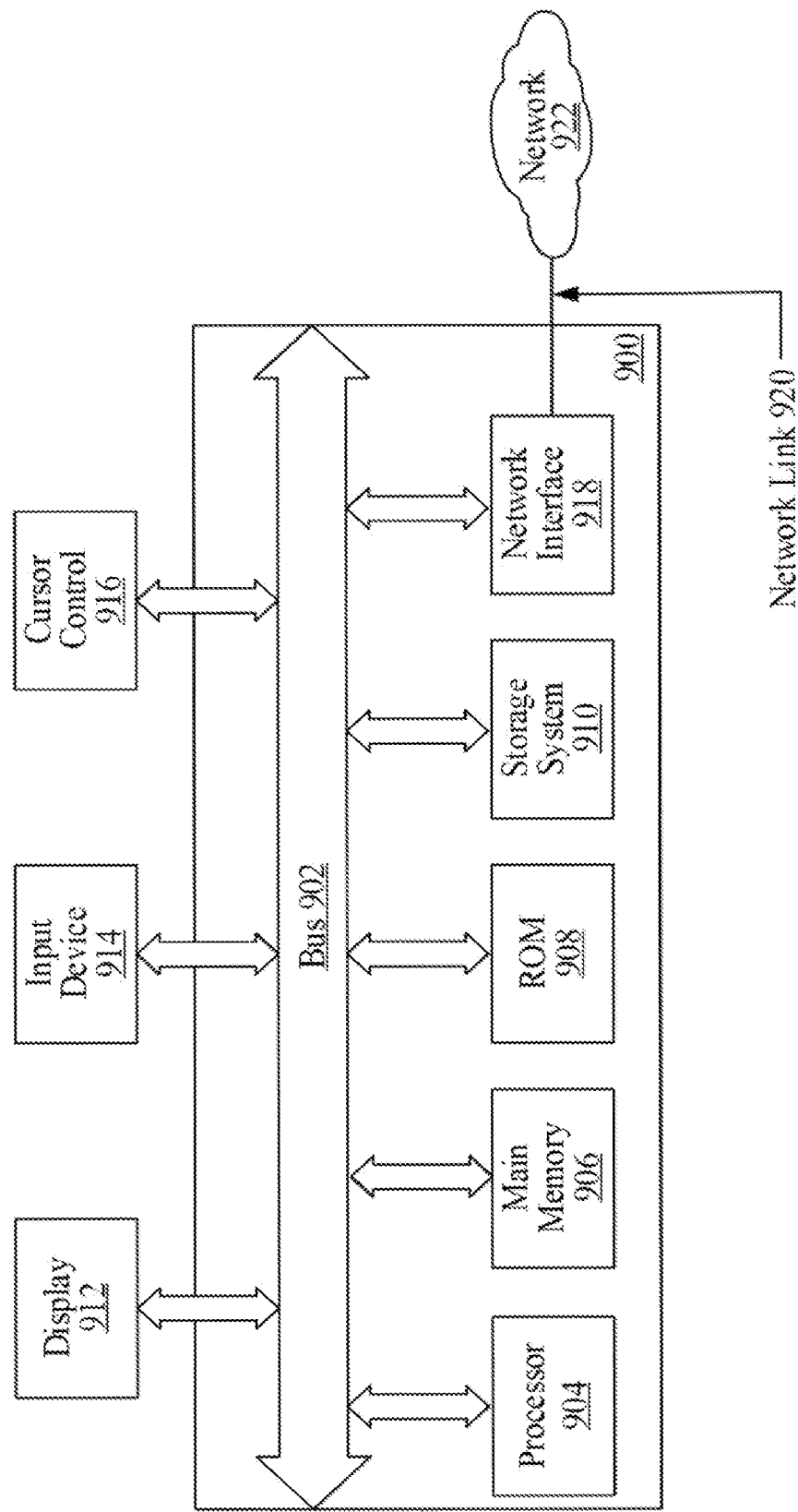
FIG. 9 is a block diagram of an example computer system used in an implementation of the disclosed approach.

FIG. 9 is a block diagram of an example computer system used in an implementation of the disclosed approach. Computer system 900 may be configured to implement the approach for visualizing a customized user watch list for vessels. In some embodiments, computer system 900 includes bus 902 or other communication mechanism for communicating information, and one or more hardware processors coupled with bus 902 for processing information.

Hardware processor 904 may be, for example, a general-purpose microprocessor, a central processing unit ("CPU") or a core thereof, a graphics processing unit (GPU), or a system on a chip ("SoC").

Computer system 900 also includes a main memory 906, typically implemented by one or more volatile memory devices, coupled to bus 902 for storing information and instructions to be executed by processor 904. Main memory 906 also may be used for storing temporary variables or other intermediate information during execution of instructions by processor 904. For example, main memory 906 may be used to store service performance information about availability and utilization of onboard service in vessels.

Computer system 900 may also include read-only memory ("ROM") 908 or other static storage device coupled to bus 902 for storing static information and instructions for processor 904.

A storage system 910, typically implemented by one or more non-volatile memory devices, is provided and coupled to bus 902 for storing information and instructions.

Computer system 900 may be coupled via bus 902 to display device 912, such as a liquid crystal display ("LCD"), a light emitting diode ("LED") display, or a cathode ray tube ("CRT"), for displaying information to a computer user. Display device 912 may be configured to display onboard service information for vessels. For example, display device 912 may be configured to generate a graphical user interface for presenting information about availability and utilization of the onboard services in vessels. Display device 912 may be combined with a touch sensitive surface to form a touch screen display. The touch sensitive surface may be an input device for communicating information including direction information and command selections to processor 904 and for controlling cursor movement on display device 912 via touch input directed to the touch sensitive surface such by tactile or haptic contact with the touch sensitive surface by a finger or a hand, or by a hand-held stylus or pen. The touch sensitive surface may be implemented using a variety of different touch detection and location technologies including, for example, resistive, capacitive, surface acoustical wave ("SAW") or infrared technology.

Input device 914, including alphanumeric and other keys, may be coupled to bus 902 for communicating information and command selections to processor 904. Input device 914 may be used to, for example, provide time range data that indicates a time range for which service performance information about availability and utilization of onboards services in vessels is requested.

Another type of user input device may be cursor control 916, such as a mouse, a trackball, or cursor direction keys for communicating direction information and command selections to processor 904 and for controlling cursor movement on display 912. This input device typically has two degrees of freedom in two axes, including a first axis (e.g., x) and a second axis (e.g., y), that allow the device to specify positions in a 2D plane.

Instructions, when stored in non-transitory storage media accessible to processor 904, such as, for example, main memory 906 or storage system 910, render computer system 900 into a special-purpose machine that is customized to perform the operations specified in the instructions. Alternatively, customized hard-wired logic, one or more ASICs or FPGAs, firmware and/or hardware logic which in combination with the computer system causes or programs computer system 900 to be a special-purpose machine.

A computer-implemented process may be performed by computer system 900 in response to processor 904 executing one or more sequences of one or more instructions contained in main memory 906. Such instructions may be read into main memory 906 from another storage medium, such as storage system 910. Execution of the sequences of instructions contained in main memory 906 causes processor 904 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 910) and/or volatile media (e.g., main memory 906). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 902. Transmission media can also take the form of acoustic or light waves, such as those generated during radio-wave and infra-red data communications.

Computer system 900 may also include a network interface 918 coupled to bus 902. Network interface 918 provides a two-way data communications-coupling to a wired or wireless network link 920 that is connected to a local, cellular or mobile network 922. For example, communication interface 918 may be IEEE 902.3 wired "ethernet" card, an IEEE 902.11 wireless local area network ("WLAN") card, an IEEE 902.15 wireless personal area network (e.g., Bluetooth) card or a cellular network (e.g., GSM, LTE, etc.) card to provide a data communication connection to a compatible wired or wireless network. In an implementation, communication interface 918 sends and receives electrical, electromagnetic or optical signals that carry digital data streams representing various types of information.

Network link 920 typically provides data communication through one or more networks to other data devices. For example, network link 920 may provide a connection through network 922 to local computer systems that is also connected to network 922 or to data communication equipment operated by, for example, network access providers. Network may use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network 922, network link 920 and communication interface 918. The received code may be executed by processor 904 as it is received, and/or stored for later execution in storage device 910, or other non-volatile storage. For example, processor 904 may be configured to execute instructions for requesting and obtaining information about completed trips, ongoing trips, and/or future-scheduled trips within the time range for each of a plurality of vessels. Processor 904 may also execute instructions for obtaining status information of onboard services provided during each trip of the corresponding trips for each vessel.

General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

What is claimed is:

1. A method for displaying a customized user watch list, the method comprising:

receiving a user request to add a particular vessel to a user watch list associated with a user;

wherein the user request to add the particular vessel to the user watch list is received upon detecting that the user selected a watch tail icon displayed within a graphical user interface (GUI) as the GUI also displays an overview for the particular vessel that is identified by a particular vessel identifier;

adding the particular vessel identifier of the particular vessel to a set of vessel identifiers of a set of vessels included in the user watch list;

obtaining status of a service type of an onboard service provided on each vessel of the set of vessels;

in response to receiving a request to display the user watch list:

generating first graphical interface data representing:

the set of vessel identifiers that corresponds to the set of vessels;

a service icon for each corresponding vessel of the set of vessels, wherein at least one feature of the service icon indicates the status of the service type of the onboard service provided by the corresponding vessel;

a watch list header comprising labels for the set of vessel identifiers and the service type;

transmitting, to a display device, the first graphical interface data to cause the display device to generate and to display the user watch list that comprises:

the watch list header; and the set of vessel identifiers and the service icons arranged in rows under the watch list header.

2. The method of claim 1, wherein the status of the service type of the onboard service is based on an aggregation of the service type of the onboard service provided during one or more trips conducted by the particular vessel during a particular period of time.

3. The method of claim 1, wherein the service icon for each corresponding vessel of the set of vessels comprises a graphical representation of the status of the service type of the onboard service provided by the corresponding vessel, and a value corresponding to a measure of the status of the service type of the onboard service provided by the corresponding vessel.

4. The method of claim 1, wherein upon detecting that the user selected the watch tail icon provided in the GUI, a first descriptor used to depict the watch tail icon in the GUI is changed to a second descriptor.

5. The method of claim 4, further comprising:
detecting that the user deselected the watch tail icon displayed within the GUI as the GUI also displays the overview for the particular vessel that is identified by the particular vessel identifier; and
in response to detecting that the user deselected the watch tail icon, removing the particular vessel identifier of the particular vessel from the set of vessel identifiers included in the user watch list.

6. The method of claim 1, further comprising:
receiving an indication of user input selecting the particular vessel identifier from the set of vessels identifiers displayed within the user watch list; and
in response to the receiving of the indication of the user input selecting the particular vessel identifier, generating and displaying an overview for the particular vessel that is identified by the particular vessel identifier.

7. The method of claim 1, further comprising:
obtaining second status of a second service type of the onboard service provided on each vessel of the set of vessels, and wherein the first graphical interface data further represents a second service icon for each corresponding vessel of the set of vessels, wherein at least one feature of the second service icon indicates the second status of the second service type of the onboard service provided by the corresponding vessel, and
wherein the watch list header further comprises a label for the second service type.

8. The method of claim 7, wherein each of the service type and the second service type are one of: an inflight entertainment (IFE) service type, an inflight connectivity (IFC) service type, an IFE session service type, a Wi-Fi connectivity service type, a Wi-Fi session service type, a TV service type, a TV session service type, a data session service type, a promotional session service type, an email service type, or a texting service type.

9. The method of claim 1, further comprising:
in response to receiving a request to share the user watch list with a group of users:
transmitting the user watch list, comprising the set of vessel identifiers, to the group of users.

10. The method of claim 4, wherein the change from the first descriptor to the second descriptor is configured to indicate that the particular vessel identifier has been added or removed from the set of vessel identifiers displayed in the user watch list.

11. The method of claim 4, wherein the first descriptor and the second descriptor differ in color, shape, or text.

12. The method of claim 1, wherein each of the rows includes a removal icon selectable to remove a row corresponding to one of the set of vessel identifiers from the user watch list.

13. An apparatus for displaying a customized user watch list, the apparatus comprising:
a processor,
memory in electronic communications with the processor; and
instructions stored in the memory and executable by the processor to cause the processor to perform:

receiving a user request to add a particular vessel to a user watch list associated with a user;
wherein the user request to add the particular vessel to the user watch list is received upon detecting that the user selected a watch tail icon displayed within a graphical user interface (GUI) as the GUI also displays an overview for the particular vessel that is identified by a particular vessel identifier;
adding the particular vessel identifier of the particular vessel to a set of vessel identifiers of a set of vessels included in the user watch list;
obtaining status of a service type of an onboard service provided on each vessel of the set of vessels;
in response to receiving a request to display the user watch list:
generating first graphical interface data representing:
the set of vessel identifiers that corresponds to the set of vessels;
a service icon for each corresponding vessel of the set of vessels, wherein at least one feature of the service icon indicates the status of the service type of the onboard service provided by the corresponding vessel;
a watch list header comprising labels for the set of vessel identifiers and the service type;
transmitting, to a display device, the first graphical interface data to cause the display device to generate and to display the user watch list that comprises:
the watch list header; and
the set of vessel identifiers and the service icons arranged in rows under the watch list header.

14. The apparatus of claim 13, wherein the status of the service type of the onboard service is based on an aggregation of the service type of the onboard service provided during one or more trips conducted by the particular vessel during a particular period of time.

15. The apparatus of claim 13, wherein the service icon for each corresponding vessel of the set of vessels comprises a graphical representation of the status of the service type of the onboard service provided by the corresponding vessel, and a value corresponding to a measure of the status of the service type of the onboard service provided by the corresponding vessel.

16. The apparatus of claim 13, wherein upon detecting that the user selected the watch tail icon provided in the GUI, a first descriptor used to depict the watch tail icon in the GUI is changed to a second descriptor.

17. The apparatus of claim 16, storing additional instructions which, when executed by the one or more processors, cause the one or more processors to perform:
detecting that the user deselected the watch tail icon displayed within the GUI as the GUI also displays the overview for the particular vessel that is identified by the particular vessel identifier; and
in response to detecting that the user deselected the watch tail icon, removing the particular vessel identifier of the particular vessel from the set of vessel identifiers included in the user watch list.

18. The apparatus of claim 13, storing additional instructions which, when executed by the one or more processors, cause the one or more processors to perform:
receiving an indication of user input selecting the particular vessel identifier from the set of vessels identifiers displayed within the user watch list; and
in response to the receiving of the indication of the user input selecting the particular vessel identifier, generating and displaying an overview for the particular vessel that is identified by the particular vessel identifier.

19. The apparatus of claim 13, storing additional instructions which, when executed by the one or more processors, cause the one or more processors to perform:
  obtaining second status of a second service type of the onboard service provided on each vessel of the set of vessels, and wherein the first graphical interface data further represents a second service icon for each corresponding vessel of the set of vessels, wherein at least one feature of the second service icon indicates the second status of the second service type of the onboard service provided by the corresponding vessel, and
  wherein the watch list header further comprises a label for the second service type.

20. The apparatus of claim 19, wherein each of the service type and the second service type are one of: an inflight entertainment (IFE) service type, an inflight connectivity (IFC) service type, an IFE session service type, a Wi-Fi connectivity service type, a Wi-Fi session service type, a TV service type, a TV session service type, a data session service type, a promotional session service type, an email service type, or a texting service type.

21. The apparatus of claim 13, storing additional instructions which, when executed by the one or more processors, cause the one or more processors to perform:
  in response to receiving a request to share the user watch list with a group of users:
  transmitting the user watch list, comprising the set of vessel identifiers, to the group of users.

22. One or more non-transitory computer-readable storage media storing computer code for displaying a customized user watch list, the computer code comprising instructions executable by one or more processors to perform:
  receiving a user request to add a particular vessel to a user watch list associated with a user;
  wherein the user request to add the particular vessel to the user watch list is received upon detecting that the user selected a watch tail icon displayed within a graphical user interface (GUI) as the GUI also displays an overview for the particular vessel that is identified by a particular vessel identifier;
  adding the particular vessel identifier of the particular vessel to a set of vessel identifiers of a set of vessels included in the user watch list;
  obtaining status of a service type of an onboard service provided on each vessel of the set of vessels;
  in response to receiving a request to display the user watch list:
    generating first graphical interface data representing:
      the set of vessel identifiers that corresponds to the set of vessels;
      a service icon for each corresponding vessel of the set of vessels, wherein at least one feature of the service icon indicates the status of the service type of the onboard service provided by the corresponding vessel;
      a watch list header comprising labels for the set of vessel identifiers and the service type;
    transmitting, to a display device, the first graphical interface data to cause the display device to generate and to display the user watch list that comprises:
      the watch list header; and
      the set of vessel identifiers and the service icons arranged in rows under the watch list header.

23. The one or more non-transitory computer-readable storage media of claim 22, wherein the status of the service type of the onboard service is based on an aggregation of the service type of the onboard service provided during one or more trips conducted by the particular vessel during a particular period of time.

24. The one or more non-transitory computer-readable storage media of claim 22, wherein the service icon for each corresponding vessel of the set of vessels comprises a graphical representation of the status of the service type of the onboard service provided by the corresponding vessel, and a value corresponding to a measure of the status of the service type of the onboard service provided by the corresponding vessel.

25. The one or more non-transitory computer-readable storage media of claim 22, wherein upon detecting that the user selected the watch tail icon provided in the GUI, a first descriptor used to depict the watch tail icon in the GUI is changed to a second descriptor.

26. The one or more non-transitory computer-readable storage media of claim 25, storing additional instructions which, when executed by the one or more processors, cause the one or more processors to perform:
  detecting that the user deselected the watch tail icon displayed within the GUI as the GUI also displays the overview for the particular vessel that is identified by the particular vessel identifier; and
  in response to detecting that the user deselected the watch tail icon, removing the particular vessel identifier of the particular vessel from the set of vessel identifiers included in the user watch list.

27. The one or more non-transitory computer-readable storage media of claim 22, storing additional instructions which, when executed by the one or more processors, cause the one or more processors to perform:
  receiving an indication of user input selecting the particular vessel identifier from the set of vessels identifiers displayed within the user watch list; and
  in response to the receiving of the indication of the user input selecting the particular vessel identifier, generating and displaying an overview for the particular vessel that is identified by the particular vessel identifier.

28. The one or more non-transitory computer-readable storage media of claim 22, storing additional instructions which, when executed by the one or more processors, cause the one or more processors to perform:
  obtaining second status of a second service type of the onboard service provided on each vessel of the set of vessels, and wherein the first graphical interface data further represents a second service icon for each corresponding vessel of the set of vessels, wherein at least one feature of the second service icon indicates the second status of the second service type of the onboard service provided by the corresponding vessel, and
  wherein the watch list header further comprises a label for the second service type.

29. The one or more non-transitory computer-readable storage media of claim 28, wherein each of the service type and the second service type are one of: an inflight entertainment (IFE) service type, an inflight connectivity (IFC) service type, an IFE session service type, a Wi-Fi connectivity service type, a Wi-Fi session service type, a TV service type, a TV session service type, a data session service type, a promotional session service type, an email service type, or a texting service type.

30. The one or more non-transitory computer-readable storage media of claim 22, storing additional instructions which, when executed by the one or more processors, cause the one or more processors to perform:

in response to receiving a request to share the user watch list with a group of users:

transmitting the user watch list, comprising the set of vessel identifiers, to the group of users.

* * * * *